United States Patent [19]
Kitagawa et al.

[11] Patent Number: 5,522,037
[45] Date of Patent: May 28, 1996

[54] BACKUP CONTROL APPARATUS AND METHOD OF DATA PROCESSING SYSTEM

[75] Inventors: Isao Kitagawa; Toru Koyasu; Isao Igarashi, all of Nagoya, Japan

[73] Assignee: Fujitsu Limited, Kawasaki, Japan

[21] Appl. No.: 248,954

[22] Filed: May 25, 1994

[30] Foreign Application Priority Data

Sep. 20, 1993 [JP] Japan .................................. 5-232130

[51] Int. Cl.⁶ .................................................. G06F 11/00
[52] U.S. Cl. ................... 395/183.16; 364/268.2; 364/268
[58] Field of Search ................ 395/578; 364/222.81, 364/222.82, 245.3, 245.9, 268.2, 268, 269.3, 285.1

[56] References Cited

FOREIGN PATENT DOCUMENTS

| | | |
|---|---|---|
| 58-166459 | 10/1983 | Japan . |
| 58-168155 | 10/1983 | Japan . |
| 61-107422 | 5/1986 | Japan . |
| 62-224843 | 10/1987 | Japan . |
| 62-243042 | 10/1987 | Japan . |
| 63-120344 | 5/1988 | Japan . |
| 2-39252 | 2/1990 | Japan . |
| 2-42523 | 2/1990 | Japan . |
| 2-59838 | 2/1990 | Japan . |
| 2-96214 | 4/1990 | Japan . |
| 2-257229 | 10/1990 | Japan . |
| 3-14045 | 1/1991 | Japan . |
| 3-19046 | 1/1991 | Japan . |
| 3-81843 | 4/1991 | Japan . |
| 3-171241 | 7/1991 | Japan . |
| 3-280143 | 12/1991 | Japan . |

OTHER PUBLICATIONS

*DOS® 5 A to Z* by Gary Masters, ©1992 by SYBEX, Inc. 61–65.

*Primary Examiner*—Vincent P. Canney
*Attorney, Agent, or Firm*—Staas & Halsey

[57] ABSTRACT

The number of present updating data is detected from an updating bit map of a backup target medium. When it is equal to or larger than a reference value, a whole backup is executed. When it is smaller than the reference value, a differential backup is executed. After the backup was obtained, a copy coupling is executed and a merge process to reduce the number of media is performed. By eliminating the unnecessary media among the media which are used and by executing the successive reading or parallel reading from backup destination media, a decoding process to a recovery medium can be executed in a shortest time.

70 Claims, 37 Drawing Sheets

FIG. 4A

| USE FREQUENCY | MEDIUM ID NUMBER |
|---|---|
| 1 | DASD00 |
| 2 | DASD08 |
| 3 | DASD11 |
| 4 | DASD24 |
| ⋮ | ⋮ |

FIG. 4B

| GROUP ID NUMBER | MEDIUM ID NUMBER | USE FREQUENCY |
|---|---|---|
| DASDG00 | DASD00<br>DASD01<br>DASD02<br>DASD03 | 1 |
| DASDG01 | DASD04<br>DASD05<br>DASD06<br>DASD07 | 2 |

FIG. 5A

| SIGNIFICANCE | MEDIUM ID NUMBER |
|---|---|
| 1 | DASD00 |
| 2 | DASD08 |
| 3 | DASD11 |
| 4 | DASD24 |
| ⋮ | ⋮ |

FIG. 5B

| GROUP ID NUMBER | MEDIUM ID NUMBER | SIGNIFICANCE |
|---|---|---|
| DASDG00 | DASD00<br>DASD01<br>DASD02<br>DASD03 | 1 |
| DASDG01 | DASD04<br>DASD05<br>DASD06<br>DASD07 | 2 |
| | | |

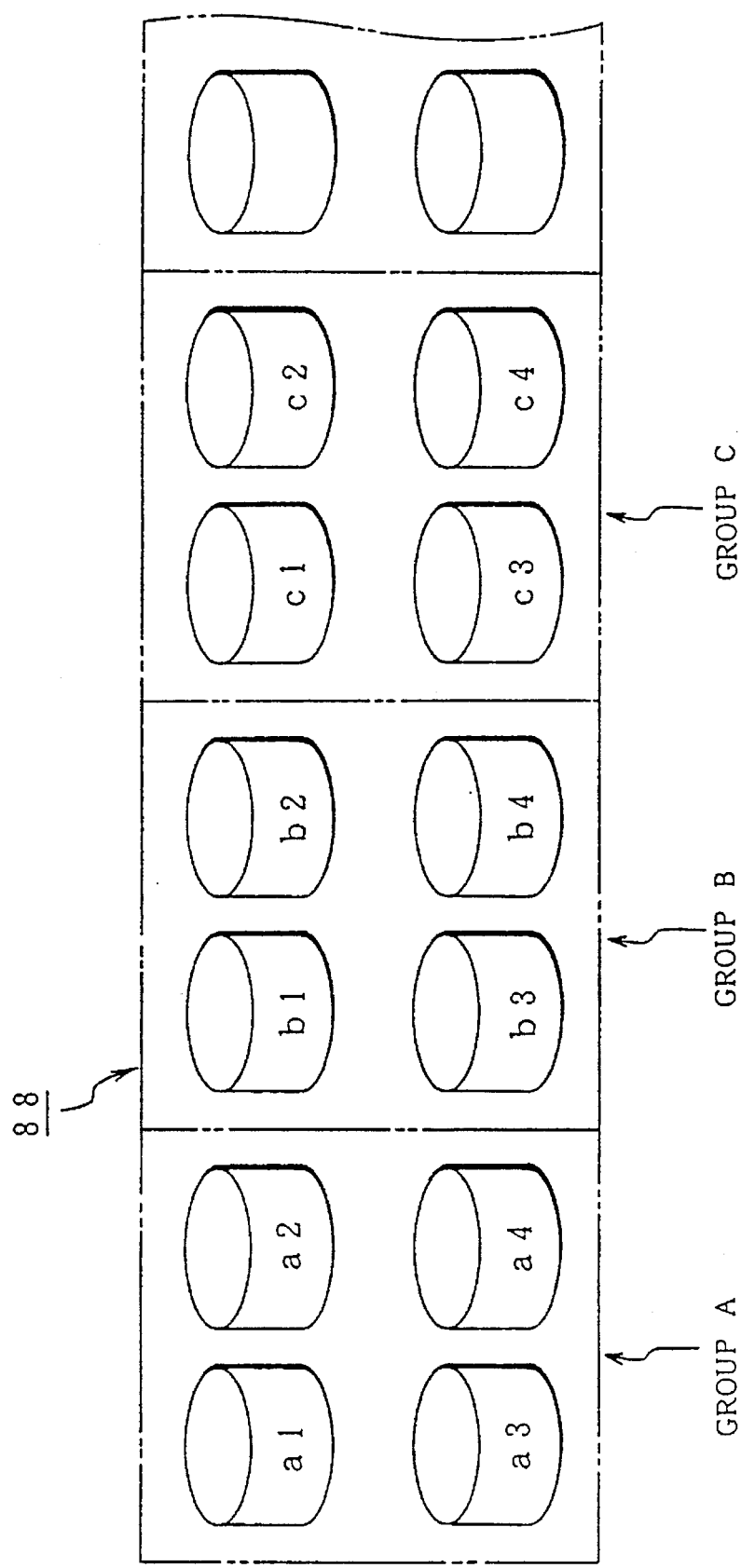

FIG. 8

| TARGET MEDIUM ID | BACKUP STYLE | MEDIUM ID |
|---|---|---|
| DASD01 | OVERALL | MT0000 |
| | NON-ACCUMULATING TYPE DIFFERENCE | MT0001 |
| | NON-ACCUMULATING TYPE DIFFERENCE | MT0002 |
| | NON-ACCUMULATING TYPE DIFFERENCE | MT0003 |
| | ⋮ | ⋮ |
| DASD11 | OVERALL | MT0010 |
| | ACCUMULATING TYPE DIFFERENCE | MT0011 |
| | ACCUMULATING TYPE DIFFERENCE | MT0012 |
| | ACCUMULATING TYPE DIFFERENCE | MT0013 |
| | ⋮ | ⋮ |

FIG. 9

| TARGET MEDIUM ID | BACKUP STYLE | MEDIUM ID | UPDATING BIT MAP |
|---|---|---|---|
| DASD01 | OVERALL | MT0000 | 11111111111111111111111 |
| | NON-ACCUMULATING TYPE DIFFERENCE | MT0001 | 100100100000000001000000 |
| | NON-ACCUMULATING TYPE DIFFERENCE | MT0002 | 000000000010000000100000 |
| | NON-ACCUMULATING TYPE DIFFERENCE | MT0003 | 100000010000000000100000 |

FIG. 10

| |
|---|
| CPU LOAD |
| EMPTY STATE OF I/O APPARATUS FOR BACKUP |
| THE NUMBER OF MEDIA AS MERGE TARGET |
| DATE |
| DAY OF THE WEEK |
| TIME |

BACKUP CONTROL APPARATUS AND METHOD OF DATA PROCESSING SYSTEM

BACKGROUND OF THE INVENTION

The present invention relates to backup control apparatus and method for storing a large amount of data which is processed to a medium such as a magnetic tape or the like and for backing up and, more particularly, to backup control method and apparatus for combining a backup of all data and a backup of only updating data as differences after that, and for using those backup data.

Recently, in a data processing system using a computer network such as banking works, insurance works, and the like, the number of direct access storage devices (DASD) such as magnetic disk units or the like which are installed increases and the backup time increases in association with a rapid increase in data amount. Generally, the backup is executed by using a time zone at night in which a work load is small. However, in association with an increase in data amount, the backup time increases so that it obstructs on-line works of the next day.

According to a conventional general backup method, each time a backup process is executed, all data on a magnetic disk unit as a backup target is copied onto a magnetic tape by using, for example, a magnetic tape unit. In the following explanation, a magnetic disk of the magnetic disk unit in which data as a backup target has been stored is called a backup target medium. A magnetic tape which is obtained by copying data of a magnetic disk unit by a magnetic tape unit is called a backup destination medium.

However, according to the conventional backup, since it is necessary to copy the whole data as a target at the backup time, the backup time increases with an increase in data amount. As a backup method to reduce the backup time as mentioned above, there is what is called a differential backup method of backing up only the updated data without backing up the data which was not updated. According to the differential backup method, it is necessary to combine and use a backup of all data (hereinafter referred to as a "whole backup") and a backup of only the updating data which was updated after the whole backup (hereinafter referred to as a "differential backup"). Further, there are the following three types of differential backup;

I. Accumulating type

II. Non-accumulating type

III. Common using type of both of the above types

The backup method differs in dependance on which backup is used as a reference in order to discriminate the updating position. That is, according to the accumulating type, the updating data is discriminated by using the previous whole backup as a reference. According to the non-accumulating type, the updating data is discriminated by using the whole backup just before or the differential backup just before as a reference. For example, in case of repeating the backup by a cycle of Monday to Saturday, according to the differential backup of the accumulating type, a whole backup tape is first obtained on first Monday. On Tuesday, a differential backup tape of only the data which was updated by using the whole backup of Monday as a reference. On Wednesday, a differential backup tape of the data which was updated by using the whole backup of Monday as a reference is also similarly obtained. The above processes are repeated until Saturday. Due to this, a differential backup in which the updating data was accumulated every day of the week is executed. On the other hand, according to the differential backup of the non-accumulating type, a whole backup tape is obtained on first Monday and a differential backup tape of only the data which was updated by using the data of the previous day as a reference is obtained with respect to each of the updating backups of remaining Tuesday to Saturday. The recovery process in case of using such a differential backup method requires the whole backup tape and the newest differential backup tape with respect to the accumulating type. The non-accumulating type uses the whole backup tape and all of the differential backup tapes which were obtained until the recovery time point, thereby reconstructing the data.

In this instance, the accumulating type process and the non-accumulating type process have the following advantages and drawbacks. According to the accumulating type process, although the data amount and the processing time at the backup time increase gradually as the differential backup is executed, the management of the backup medium and the recovery process are easy. On the other hand, according to the non-accumulating type process, since only the newest updating data is processed, although the data amount and the processing time at the backup time don't increase, the number of backup destination media gradually increases as the differential backup is executed, and the medium management and the recovery process are complicated.

However, in the backup method using the conventional differential backup process, a work manager or the like who executes the backup manually judges and determines every time whether the whole backup is executed or the differential backup is executed. The judgement about such a use method cannot help depending on his experience, so that it is difficult to correctly use the optimum backup. In the conventional differential backup process, since at least one or a plurality of differential backup destination media are needed in addition to the whole backup destination medium at the recovery time, it took a longer time as compared with the ordinary recovery process in which only the whole backup destination medium is used. Particularly, since the work is interrupted during the recovery, it is necessary to reduce the time.

Further, in the conventional differential backup process, since which potion of the backup target medium had been backed up as updating data was recorded in only the backup destination medium, the necessity of the data can be judged only after the backup destination medium was read out at the recovery time, so that there is a problem such that in case of an unnecessary backup destination medium, the time and the efforts are wasted.

Further, in the recovery process using the conventional differential backup destination medium, the data of the whole backup destination medium is first written and, after that, the updating data of the differential backup destination medium is written. Due to this, in the case where most of the data which had been whole backed up was updated by the differential backup, assuming that the number of backup destination media as an input of the recovery is set to (n), the recovery time of about (n) times is needed as compared with the recovery of only the whole backup destination medium.

Further, in the case where the effective region for updating the data of the backup target medium changes or decreases for the period of the time from the whole backup process to the differential backup process, the data of the region before the change or reduction in which the data was once written back must be erased at the time of recovery in order to protect the secret of the changed or decreased portion, so that it takes a long time for recovery.

In addition, in the recovery process using the conventional differential backup, since the recovery was executed by reading out sequentially the whole backup destination medium and the differential backup destination media one by one, the data to be written out at the recovery time is scattered, so that, for example, even if there are a plurality of input/output apparatuses which can be used at the recovery time, the maximum performance of the hardware cannot be extracted.

SUMMARY OF THE INVENTION

According to the present invention, backup control apparatus and method of a data processing system for obtaining optimum backup data in which a whole backup and differential backups are combined and for enabling a recovery process after the backup data was obtained to be efficiently executed in a short time.

For example, the invention has the following construction of an apparatus. First, in the invention, in order to automatically properly use a whole backup and differential backups, a backup operation environment is defined by an environment defining section on the basis of predetermined backup definition information. The backup operation environment which was defined by the environment defining section, information of a backup target medium on a magnetic disk of a magnetic disk unit, and information of a backup destination medium using a magnetic tape are registered into a control information managing section as a control data set (CDS) and are managed.

When the start of a backup automatic process to the backup processing section is instructed from the outside by a backup instructing section, each time the backup start conditions are satisfied with reference to the contents in the control information managing section, either one of the whole backup process for copying all data of the backup target medium to a backup destination medium 62 and the differential backup process for extracting the data which was updated for the backup processing data as a reference in the data of the backup target medium as differential data and for copying to the backup destination medium is judged and executed. An updating bit map table as information indicative of the position of the updating data of the backup target medium is provided in the backup target medium itself or in a control section of an input/output apparatus of the backup target medium. An initializing process for the bit map table and a writing process of the updating position information are executed. The backup processing section executes the non-accumulating type differential backup process for extracting differential data which was updated by using the just-previous whole backup data or differential backup data of the backup target medium as a reference and for copying to the backup destination medium every differential backup process. It is also possible to perform an accumulating type differential backup process for extracting the differential data which was updated by using the previous whole backup data of the backup target medium as a reference and for copying to the backup destination medium. As for the proper use of the whole backup and the differential backup by the backup processing section, the number of present updating data in the backup target medium is compared with a predetermined reference value, and when it is equal to or larger than the reference value, the whole backup process is executed, and when it is smaller than the reference value, the differential backup process is executed. In this manner, either one of the whole backup process and the differential backup process is automatically properly used.

The control information managing section designates the backup target media on a medium unit basis and, in this case, the backup processing section executes the backup process on a designation medium unit basis. The control information managing section can also divide the media into a plurality of groups every plurality of media and can designate to the backup targets. In this case, the backup processing section executes the backup process on a designation group unit basis. Such a grouping process can be hierarchically executed in accordance with the use frequency or significance of the medium. Further, it is also possible to construct in a manner such that by dividing one group into a plurality of lower groups, it is divided into hierarchy groups of a tree structure in a range from upper groups to lower groups and, further, a backup operation environment is set every group hierarchy. As backup destination medium information, the control information managing section registers table information in which ID number of the backup target medium, identifier indicative of a format of backup, and ID number of the backup destination medium have been stored. As an identifier indicative of the backup format, an identifier indicative of the whole backup, non-accumulating type differential backup, or an accumulating type differential backup is used.

The backup processing section extracts the data to be backed up with reference to the bit map table indicative of the updating position showing the position of the updating data which was provided in a volume table of contents (VTOC) of the backup target medium. The bit map table indicative of the updating position obtained from the backup target medium is stored together with the backup data into the backup destination medium. The backup processing section can also register the bit map table indicative of the updating position obtained from the backup target medium into the control information managing section and manage. Further, it is also possible to provide the bit map table for the input/output control apparatus of the backup target medium and to record the updating state of the data. Moreover, since the effective region information which is managed by an upper software has been registered in the volume table of contents (VTOC) of the backup target medium, by referring to the bit map table indicative of the position of the updating data derived from the backup target medium and the bit map table indicative of the effective region to be accessed by the upper apparatus, the backup processing section can also extract the data at the positions where the AND of both of them is obtained as backup data.

In the backup control apparatus of the data processing system according to the invention, further, a merge processing section is provided and a merge process (copy coupling process) such that the backup data of the whole backup destination medium and a plurality of backup destination media which have already been obtained is merged and is stored into a smaller number of backup destination media is executed. Such a merge process is automatically executed on the basis of executing conditions which have previously been registered in the control information managing section. For example, the merge process is executed in the case where a work load of the data processing system decreases and there is a vacancy in the input/output apparatus of the backup destination medium. The merge process, on the other hand, is executed in accordance with a discrimination result regarding whether the format of the differential backup destination medium as a merge target obtained from the backup destination medium information of the control information managing section is the non-accumulating type, the accumulating type, or further, the mixture type. In the case where a plurality of differential backup destination media are the non-accumulating type, a merge process is executed in a manner such that the newest data among the whole backup destination medium and all of the differential backup destination media is left as effective data, and one whole backup destination medium is produced. In the case where a plurality of differential backup destination media as merge targets are the non-accumulating type, a merge process is executed so that the newest data among all of the differential backup destination media is left as effective data, and one accumulating type differential backup destination medium can be also produced. Such a method is effective in the case where there is no processing time which is required until the whole backup destination medium is produced. In the case where the differential backup destination medium as a merge target is the accumulating type, a merge process is executed so that the newest data in the whole backup destination medium and the newest accumulating type differential backup destination medium is left as effective data, and one whole backup destination medium is produced. Even in the merge process, the merge process can be also designated on a medium unit basis or on a unit basis of a group of a plurality of media. Further, it is also possible to construct in a manner such that by dividing one group into a plurality of lower groups, it is divided into hierarchy groups of a tree structure in a range from upper groups to lower groups and, further, merge executing conditions are set every group hierarchy.

Further, in the backup control apparatus of the data processing apparatus according to the invention, the recovery operation environment is set by the environment defining section in order to efficiently execute the recovery process after the backup was obtained. When the start of the recovery process is instructed from the outside by the recovery instructing section, the recovery processing section refers to the control information managing section and discriminates whether the identifier of the backup destination medium which is used in the recovery process indicates the differential backup or not. In the case where no differential backup destination medium is included, the ordinary recovery process for copying (restoring) the data of the whole backup destination medium to the recovery destination medium is executed. In the case where the differential backup destination medium is included, the recovery process for producing recovery data from the whole backup destination medium and the differential backup destination medium and for copying (restoring) to the recovery destination medium is executed. In case of executing the recovery process by using a plurality of differential backup destination media, the recovery processing section discriminates the differential backup destination media which are not used in the recovery process on the basis of the bit map table indicative of the updating position of the differential backup destination medium which was registered in the control information managing section at the time of the backup process and eliminates such differential backup destination media from the processing targets. Specifically speaking, the effective bits of another updating bit map existing at the same positions as those of the effective bits of the updating bit map indicative of the newest updating position in a plurality of differential backup destination media are changed to invalid bits. The differential backup destination medium of the updating bit map in which all of the bits are set to the invalid bits is eliminated from the processing target.

In case of executing the recovery process by using a plurality of differential backup destination media, when the number of input/output apparatuses which are used to read the backup destination media is equal to 1, the recovery processing section executes the recovery process such that the data is sequentially read out from the newest differential backup destination medium and the newest updating data is left as backup data. Specifically speaking, the effective region bit map indicative of the effective region is developed from a plurality of backup destination media which are used for recovery and the updating bit map indicative of the updating position is also developed. Subsequently, the process such that the updating data corresponding to the effective bit position of the newest updating bit map is written to the recovery destination medium and the effective bits which have already been written in the newest effective region bit map are switched to the invalid bits is sequentially repeated from the new backup destination medium toward the old backup destination medium until all of bits in the effective region bit maps are switched to the invalid bits. Due to this, only the newest updating data is written as effective data to the recovery destination medium. It is avoided that the updating data is overlappingly written at the same position.

In the case where a plurality of input/output apparatuses are used to read the backup destination medium, the recovery processing section simultaneously reads the backup data from a plurality of backup destination media and, in the case where a plurality of updating data overlap at the same position, the newest updating data is written as effective data to the recovery destination medium. Specifically speaking, the read-out position information of the backup destination medium is designated for each of a plurality of input/output apparatuses. The write position information of the backup destination medium is designated to the input/output apparatus of the recovery destination medium. A use right (task) of the central processing unit is allocated to each of the reading process (read task) and the writing process (write task) of a plurality of input/output apparatuses, thereby allowing the processes to be executed in parallel.

According to the invention as mentioned above, the following operations are obtained. First, each time the backup start conditions are satisfied, the updating bit map of the backup target medium is read and the number of present updating data is detected. When it is equal to or larger than a reference value, the whole backup is used. When it is smaller than the reference value, the differential backup is used. Therefore, the optimum backup according to the updating situation of the data can be obtained. For example, in the case where the whole region of the backup target medium has already been updated, the whole backup is used. In the case where no portion is updated, the differential backup is used.

For the backup which was used, the merge process such that a plurality of backup destination media are rearranged to one whole backup destination medium is executed by using a time zone during which the work load is small. Therefore, even when the number of media which are used for recovery by the differential backup process is increased, those media are rearranged to a single whole backup destination medium and it is judged such that the recovery can be performed by a single medium. The recovery time can be reduced and the medium management can be simplified.

On the other hand, upon activation of the recovery process, the updating bit map of a plurality of recovery destination media which were registered in the control data set (CDS) at the time of backup is used and the differential backup destination media which are not used for recovery are discriminated and eliminated, thereby enabling the necessary minimum number of backup destination media to be used. The optimum recovery is executed in dependence on whether the number of input/output apparatuses of the backup destination media which are used for recovery is equal to one or a plural number. When only one input/output apparatus is used, the data is sequentially read in accordance with the order from the newest differential backup destination medium. When a plurality of data overlap, the newest data is written as effective data to the recovery destination medium. In this instance, when the effective bits exist at the same position in the updating bit map of the subsequent backup destination medium, those effective bits are turned off and are switched to the invalid bits. Thus, at a time point when the updating bit map in which all bits are switched to the invalid bits is derived, the completion of the recovery can be judged. A vain rewriting operation of the overlapped data is eliminated and even if one input/output apparatus is used, the recovery process is executed in a shortest time. In the case where a plurality of input/output apparatuses can be used, the data at the same position of a plurality of backup destination media is read out in parallel and, when there is overlapped effective data, the newest data is rewritten as recovery data and the performance of the hardware can be made the most of. The recovery time can be reduced to almost the same time as that in case of only the whole backup.

The above and other objects, features, and advantages of the present invention will become more apparent from the following detailed description with reference to the drawings.

BRIEF DESCRIPTION OF THE DRAWINGS

FIGS. 4A and 4B are explanatory diagrams of management information of backup target media based on use frequencies;

FIGS. 5A and 5B are explanatory diagrams of the management information of backup target media based on significance;

FIG. 6 is an explanatory diagram showing a grouping process of backup target media;

FIG. 8 is an explanatory diagram of management information of backup destination media;

FIG. 9 is an explanatory diagram of management information of backup destination media to which updating bit maps have simultaneously been registered;

FIG. 10 is an explanatory diagram of a merge condition registration table of a differential backup destination medium;

DETAILED DESCRIPTION OF THE PREFERRED EMBODIMENTS

Hardware Construction and Whole Function

Figure 1:
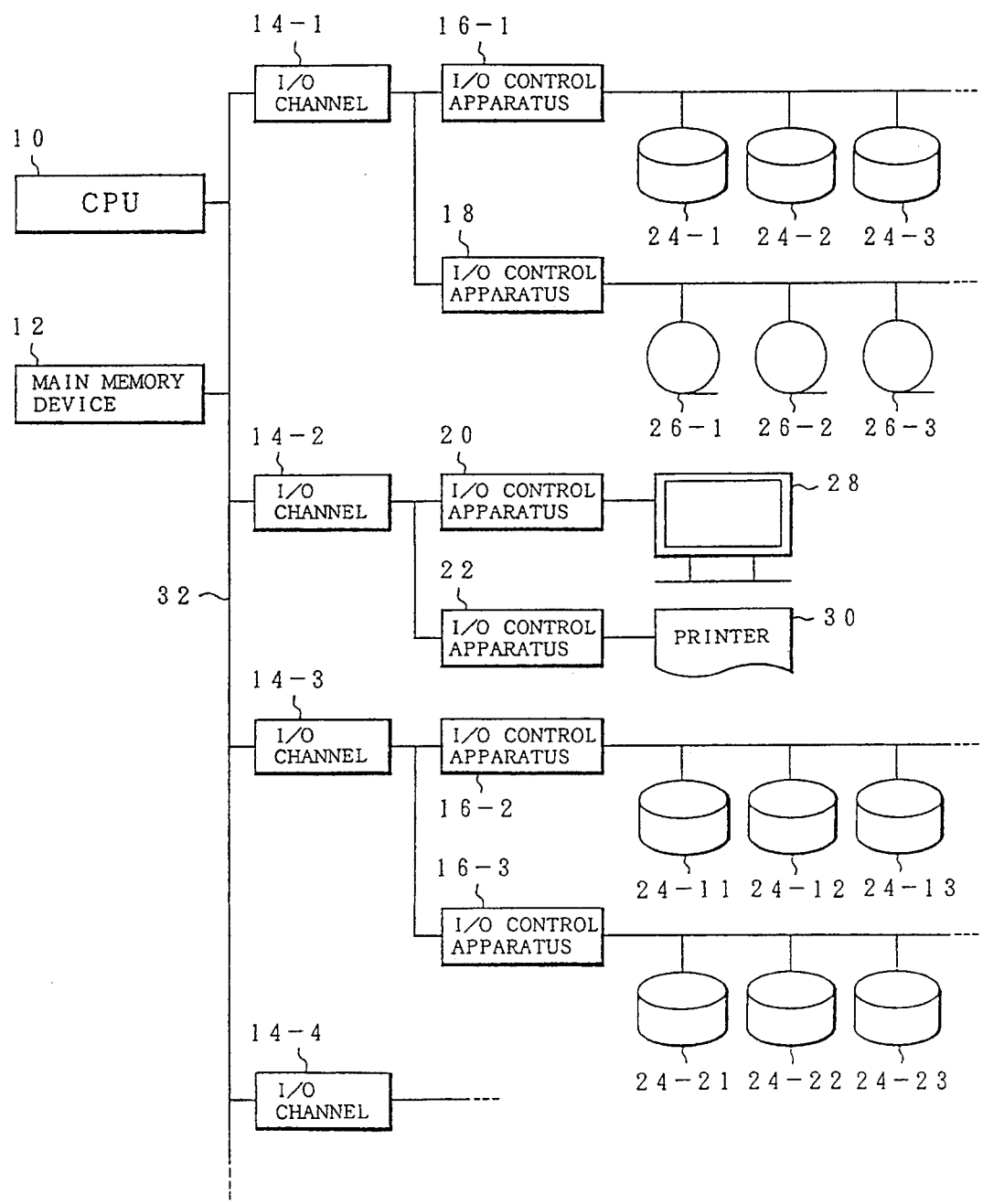
FIG. 1 is a block diagram showing a hardware of a computer system to which the present invention is applied.

FIG. 1 shows a hardware construction of a computer system to which a backup control of the invention is applied. In the computer system, a main memory device 12 is connected to a bus line 32 of a central processing unit 10. Further, input/output channel devices 14-1 to 14-4 are connected to the bus line 32. In the embodiment, magnetic disk units 24-1 to 24-3, 24-11 to 24-13, and 24-21 to 24-23 as direct access storage devices (DASD) are connected to the input/output channel devices 14-1 and 14-3 through input/output control apparatuses 16-1 to 16-3 for disks. Data processed by the central processing unit 10 is stored as an external memory device into the magnetic disk units 24-1 to 24-23. An input/output control apparatus 18 for a magnetic tape is also connected to the input/output channel device 14-1. A plurality of magnetic tape units 26-1 to 26-3 are connected to the input/output control apparatus 18 for magnetic tapes. The magnetic tape units 26-1 to 26-3 are used to input/output backup data for magnetic tapes as backup destination media. An operator console 28 is connected to the input/output channel device 14-2 through an input/output control apparatus 20 for a console. Further, a modem apparatus 25 is connected to the input/output channel device 14-4. Data can be transmitted/received to/from an external apparatus by a communication line through the modem apparatus 25. Therefore, it can be used as what is called an on-line system.

Figure 2:
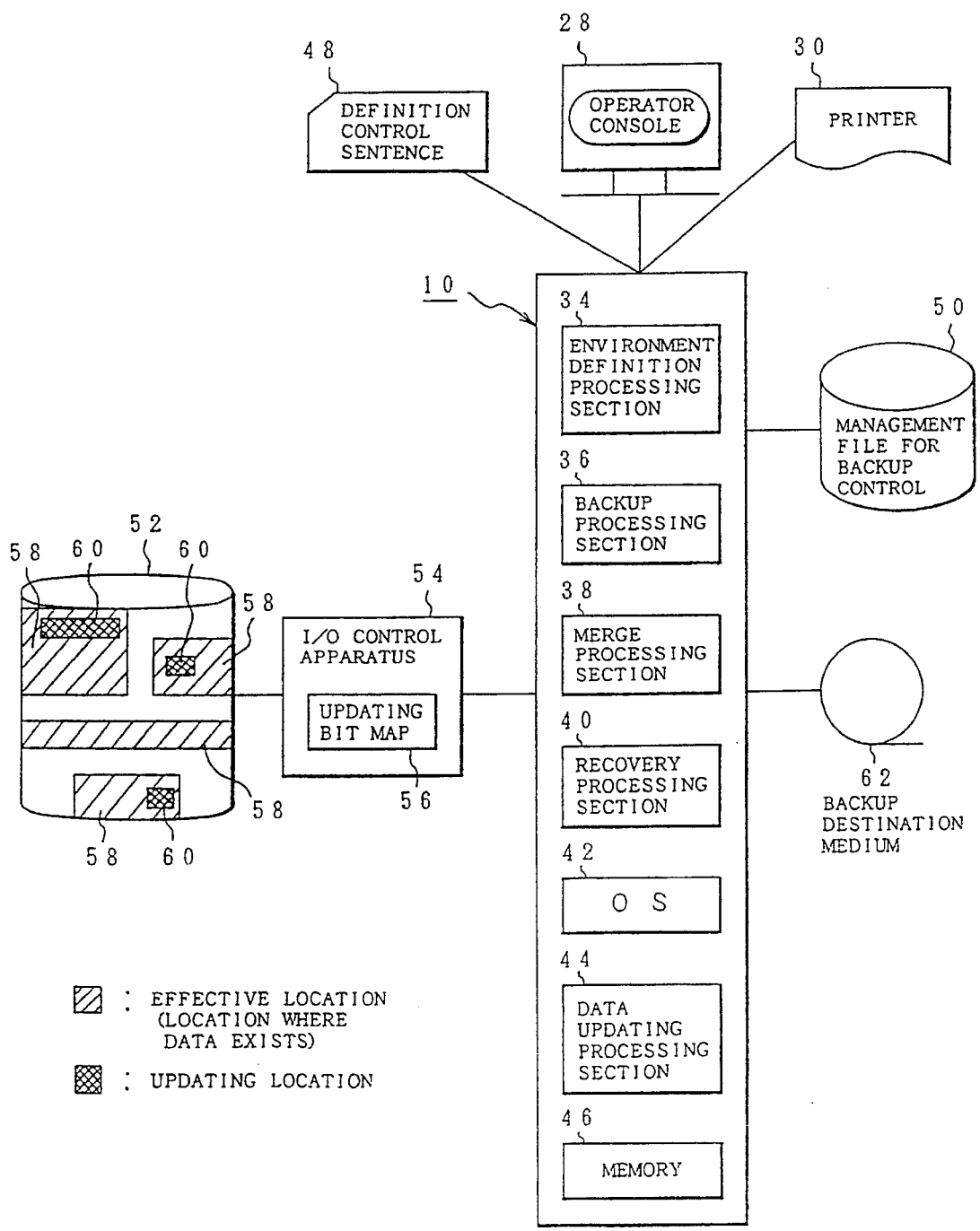
FIG. 2 is an explanatory diagram showing processing functions according to the invention.

FIG. 2 shows a processing function of a backup control of the invention which is realized by a program control of the hardware of FIG. 1. As shown in the central processing unit 10, an environment definition processing section 34, a backup processing section 36, a merge processing section 38, and a recovery processing section 40 are realized as functions of an application program by the execution of programs stored in the main memory device 12. A request from each of the application processing sections is processed by an operating system 42. Further, a function of a data updating processing section 44 to update data of a backup target medium 52 and a function of a memory 46 to develop data which is necessary in a processing operation are realized. As external functions for the central processing unit 10, a definition control sentence 48, the operator console 28 to execute various kinds of control instructions, and a printer 30 to print out necessary data are provided. Further, as a control data set to register and manage various kinds of control information which are necessary for the backup control of the invention, a management file 50 for a backup control is provided.

The magnetic disk unit in FIG. 1 in which data as a backup target has been stored is shown as a backup target medium 52 in FIG. 2. The backup target medium 52 is connected to the central processing unit 10 through an input/output control apparatus 54. A data region of the backup target medium 52 is subjected to an allocation of an effective region 58 where data is updated. For data included in the effective region 58, updating data 60 is updated by the data updating processing section 44 of the central processing unit 10. The data updating processing section 44 properly sets the effective region 58 by a software process. For example, in case of a virtual memory computer system, the position information of the effective region 58 allocated to the backup target medium 52 has been stored in a volume table of contents (VTOC) of the magnetic disk unit as a bit map table on a track unit basis. The position of the updating data 60 in the effective region 58 which was updated by the data updating processing section 44 has also similarly been stored as an updating bit map table in which one track in the volume table of contents (VTOC) was made correspond to one bit. Therefore, by referring to the volume table of contents in the magnetic disk unit as a backup target medium 52, the effective region 58 and the position of the updating data 60 in the effective region 58 can be recognized. Further, the updating bit map table indicative of the position of the updating data 60 can be also managed by the input/output control apparatus 54 without referring to the volume table of contents of the backup target medium 52. That is, the memory region to store an updating bit map table 56 is secured in the input/output control apparatus 54 and corresponding bits in the updating bit map table of the input/output control apparatus 54 corresponding to the updating data 60 are set every time the backup target medium 52 is updated by a hardware.

A construction such that the updating bit map table 56 is provided in the input/output control apparatus 54 is excellent from a viewpoint such that, as shown in FIG. 1, in the case where a plurality of magnetic disk units are connected to each of the input/output control apparatuses 16-1 to 16-3 for disk, only by accessing the input/output control apparatus when each magnetic disk unit is accessed, an updating bit map table of a magnetic disk unit as a backup target is obtained. It is desirable to use a non-volatile memory as an updating bit map table 56 to be provided in the input/output control apparatus 54 in order to prevent information disappearance due to a power shut-off. As a backup destination medium 62 which is connected to the central processing unit 10, a magnetic tape in which reading and writing operations of data by a magnetic tape unit is used in the embodiment.

Backup Process

Figure 3:
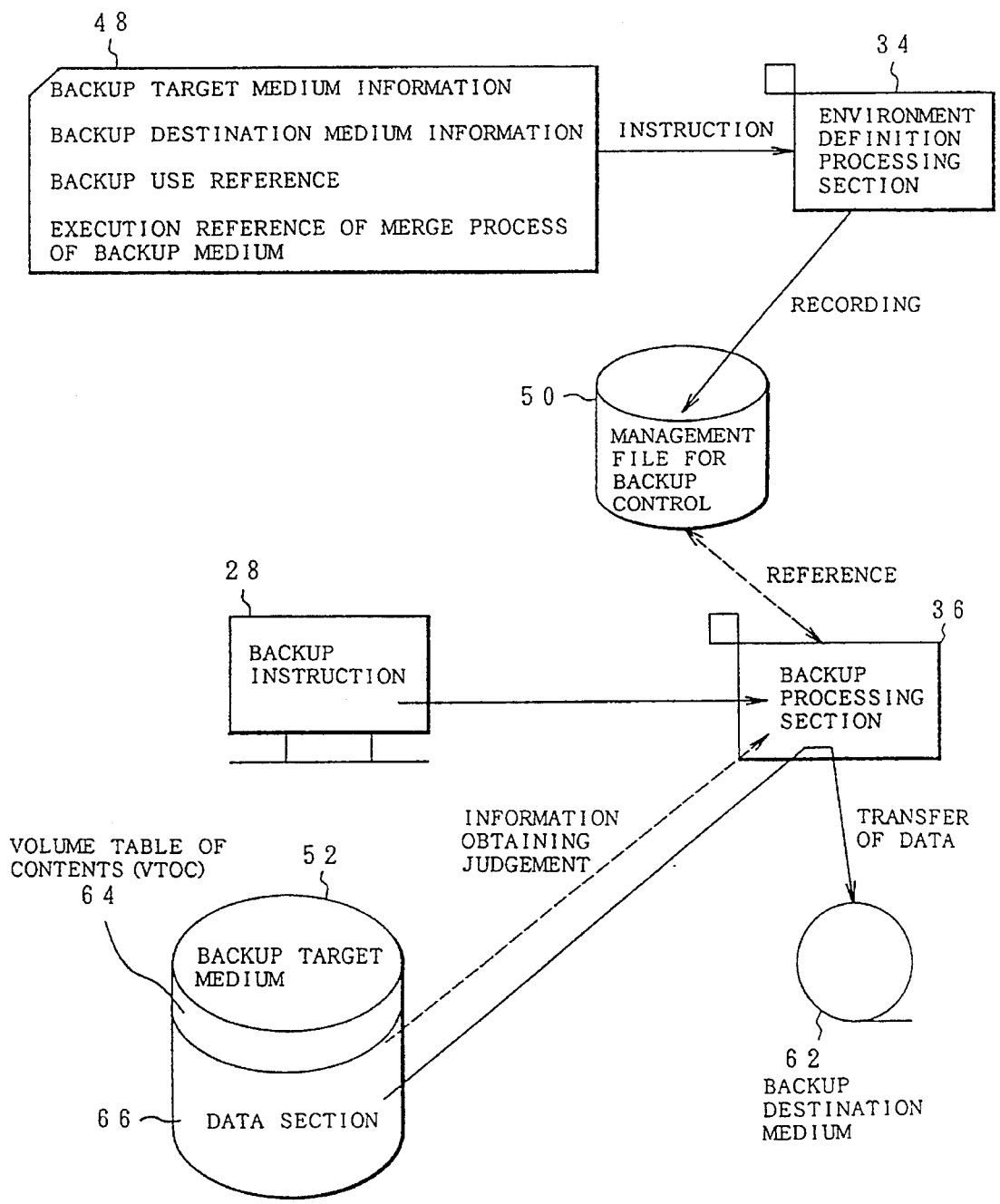
FIG. 3 is an explanatory diagram showing a function of a backup process of the invention.

FIG. 3 shows functions of a backup process according to the present invention shown in FIG. 2 and they will be further described in details. First, as definition control sentence 48, information regarding the backup target medium 52, information regarding the backup destination medium 62, a reference to decide whether the whole backup process is used or the differential backup process is used, and further, a reference to execute a merge process to put in order the backup destination medium 62 in which back up has already been completed are determined. Such contents of the definition control sentence 48 are preliminarily made when an environmental design and an environmental setting of the computer system shown in FIG. 1 are executed. The definition control sentence 48 is given to the central processing unit 10 by a proper method such as menu process, command input, job designation, or the like using the operator console 28. When the instruction is received, the environment definition processing section 34 registers the contents designated by the definition control sentence 48 into the management file 50 for a backup control which functions as a control data set (CDS). A magnetic disk unit is used as a management file 50 for a backup control in this embodiment. Other than the magnetic disk unit, it is also possible to store in a proper medium such as semiconductor disk unit using a semiconductor memory, system memory apparatus, optical disk unit, floppy apparatus, or the like. According to the registration based on the definition control sentence 48 by the environment definition processing section 34, the following contents are registered as table information, respectively, in the management file 50 for a backup control:

I. backup target medium management information

II. backup destination medium management information

III. reference when using a backup

IV. merge execution condition

FIG. 4A shows a management information table of backup target media which is registered in the management file 50 for a backup control. Medium identification (ID) numbers of the backup target media have been registered in the backup target medium management information table in accordance with the order of use frequencies of 1, 2, 3, 4, . . . . Therefore, when a backup process is instructed, the backup target medium management table is referred and the backup process is started from the backup target medium having the medium ID number 'DASD00' of the highest use frequency. In the backup target medium management information table of FIG. 4B, the backup target media are grouped according to the use frequencies. When the backup instruction is received, therefore, the backup process is executed on a group unit basis from the backup target medium which belongs to the group ID number of the highest use frequency. By using the management information table of the backup target media which was divided like a hierarchy in accordance with the use frequencies, the backup process can be preferentially executed from the backup target medium of the highest use frequency or the highest significance.

FIGS. 5A and 5B show other embodiments of the management information table of the backup target media which is registered into the management table 50 for a backup control. In the embodiment, the backup target media are hierarchically classified in accordance with the significances Namely, in FIG. 5A they are hierarchically registered on a backup target medium unit basis in accordance with the significances. In FIG. 5B, the backup target media are hierarchically registered by the grouping according to significances. With respect to the dividing method of the hierarchy backup priority orders on a medium unit basis or when the backup target media are divided in groups, it is also possible to use proper parameters in accordance with the necessity other than the use frequencies or the significances.

Figure 7:
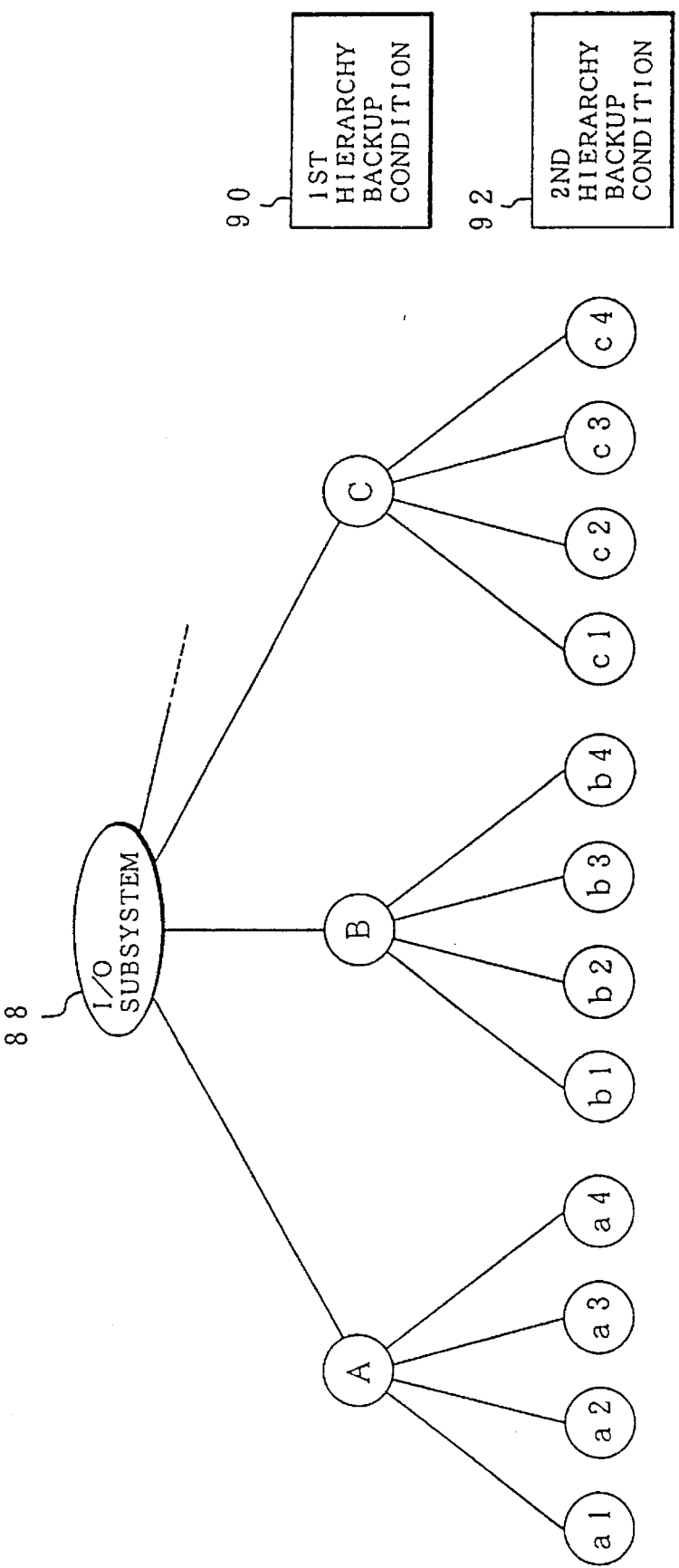
FIG. 7 is an explanatory diagram showing a tree structure of a hierarchy grouping process with respect to FIG. 6.

Further, as another embodiment of the grouping of the backup target media, it is grouped by hierarchically dividing the media in one group. FIG. 6 shows an input/output subsystem 88 comprising a plurality of magnetic disk units as backup targets. In the input/output subsystem 88, the magnetic disk units are divided into groups A, B, and, C in accordance with a predetermined grouping reference. Further, every four magnetic disk units a1 to a4, b1 to b4, and c1 to c4 indicative of the lower groups are included in the groups A, B, and, C. FIG. 7 shows a tree structure according to the hierarchy grouping regarding FIG. 6 as a target. The input/output subsystem 88 constructing one big group is first divided into groups A, B, and, C. The group A is divided into lower groups a1 to a4; similarly, the group B into lower groups b1 to b4 and the group C into lower groups c1 to c4. The unit of the lowest hierarchy of the group division is set to one magnetic disk unit. In correspondence to such a hierarchical grouping, the first hierarchy backup condition 90 and a second hierarchy backup condition 92 shown on the right side are set as a backup operation environment every hierarchy. As a backup condition to be set every hierarchy, for example, the reliability of the magnetic disk unit is used. Specifically, the number of seek error times as an evaluation function of the reliability of the magnetic disk is monitored and an error number times threshold value which is high in the low hierarchy and is lower as the hierarchy becomes higher is set every hierarchy. When the backup process is started, the actual number of error times and the threshold value are sequentially compared in accordance with the order from the lowest group and the groups in which the number of error times exceeds the threshold value are selected as backup targets. When a system of the group A in FIG. 7 is considered as an example, first, with respect to the lowest groups a1 to a4, the number of error times of each group is compared with the error number times threshold value which was set as a second hierarchy backup condition 92. Each of the lowest groups a1 to a4 is constructed by one magnetic disk unit. Therefore, the number of error times of each magnetic disk unit is compared with the threshold value. For example, when the numbers of error times of the groups a1 to a3 exceed the threshold value and the number of error times of the group a4 doesn't exceed the threshold value, the backup order of the highest priority is set to the groups a1 to a3. In case of the group a4 in which the number of error times doesn't exceed the threshold value, the number of error times is compared with the error number times threshold value of the first hierarchy backup condition 90 which was set in the upper group A. If it exceeds the threshold value, the backup order lower than the order of the second hierarchy is set. If it doesn't exceed the threshold value, since there is no more upper hierarchy, the group a4 is eliminated from the backup targets at this time. Accordingly, a backup process in which the backup target of a low reliability is preferentially selected can be executed. Although FIG. 7 shows the case where the media were grouped into two hierarchies, the number of hierarchies can be arbitrarily decided as necessary.

FIG. 8 shows a management information table of the backup destination medium 62 which is registered in the management file 50 for a backup control in FIGS. 4A and 4B. In a management information table 70 of the backup destination media, an ID (identification) number 72 of the backup target medium, an identifier 74 showing a form of the backup process, and further, an ID number 76 showing the backup destination medium have been registered. For example, with respect to a backup target medium ID=DASD01, four backup destination medium numbers MT0000 to MT0003 are registered. Among the backup destination media, the whole backup process is executed to the head medium and the non-accumulating type differential backup process is executed to the remaining three media. With respect to the backup target medium ID=DASD11, it will be understood that the whole backup process is executed to the head medium and the accumulating type differential backup process is executed to the remaining three media.

FIG. 9 shows another embodiment of a management information table of the backup destination media which is registered in the management file 50 for a backup control of FIG. 3. The table of FIG. 9 is characterized in that an updating bit map 82 which the target medium has is added to the management information table 70 shown in FIG. 8. The reason why the updating bit map 82 is added as mentioned is because in case of a recovery process, which will be clearly explained later, by merely referring to the management file 50 for a backup control without reading the backup destination medium, a state of the updating data in the backup destination medium to be used for recovery can be known.

FIG. 10 shows an execution condition table of the merge process to execute the merge process to a plurality of backup destination media which are registered in the management file 50 for a backup control of FIG. 3 as targets. An addition condition of the CPU to start the merge process, a vacancy condition of the input/output apparatus for backup which can be used for the merge process, and conditions such as the number of backup destination media as targets to be merged, date, day of the week, time, and the like have been registered in the execution condition table of the merge process by the process of the environment definition processing section 34 based on the definition control sentence 48.

Referring again to FIG. 3, when a backup instruction by a work manager or the like is received through the operator console 28, the backup processing section 36 automatically starts the backup process in accordance with the backup start conditions registered in the management file 50 for a backup control by the environment definition processing section 34. As backup start conditions, for example, the cycle of the backup is set to a period from Monday to Saturday and the backup process is automatically executed by using the night time zone during which a work load is small. With respect to the contents of the backup process by the backup processing section 36, either one of the whole backup process and the differential backup process is automatically Judged and executed in accordance with the backup proper use reference.

Proper Use of the Backup Process

Figure 11:
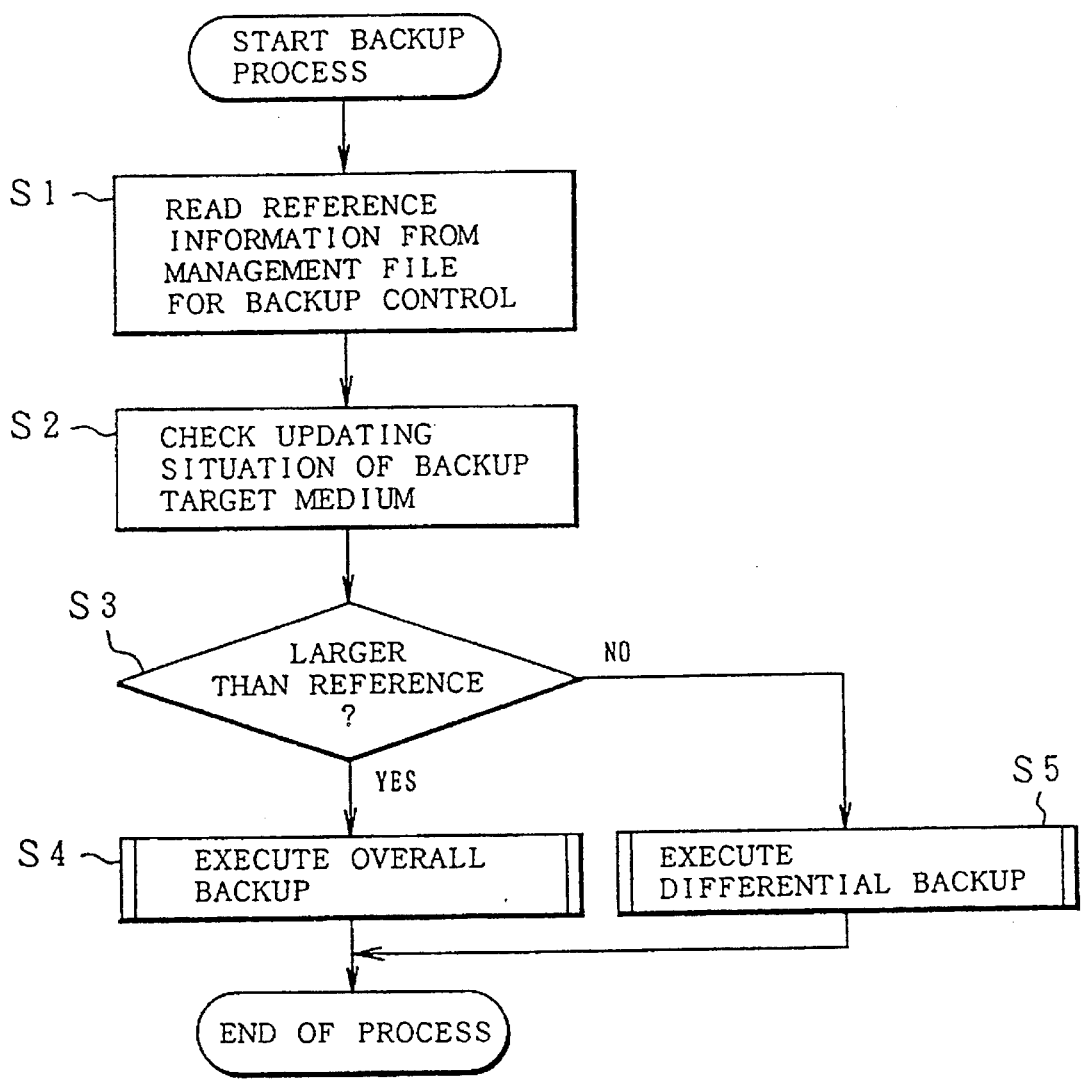
FIG. 11 is a flowchart showing a main routine for a backup process of the invention.

A flowchart of FIG. 11 shows a main routine for the backup process of the present invention by the backup processing section 36 of FIG. 3. Before the process of FIG. 11, the backup processing section 36 monitors backup conditions which have preliminarily been defined. For example, a period from Monday to Saturday is set to one cycle and the backup process is activated when a time reaches the designated night time when the work of the day is finished and a load is small. It is also possible to fixedly predetermine the backup target media. Or, as shown by the hierarchy grouping of FIG. 6, only the groups which satisfy the backup conditions set in each hierarchy can be selected as backup target media. When the predefined backup conditions as mentioned above are satisfied, the process in FIG. 11 is started. First, in step S1, reference information to decide whether the process is the whole backup process or the differential backup process is read from the management file 50 for a backup control. Subsequently in step S2, an updating situation in the backup target medium 52 is checked. Specifically speaking, an updating bit map table indicative of the position of the updating data is read out from the backup target medium 52 side and the number of effective bits in which the bits are set to ON "1" is detected. In step S3, a check is made to see whether the number of updating data detected exceeds the reference value which was read in step S1 or not. When it exceeds the reference value, step S4 follows and the whole backup process is executed. On the other hand, when it doesn't exceed the reference value, the differential backup process is executed in step S5. In the whole backup process in step S4, as shown in the sub-routine of FIG. 12, first in step S1, the backup process for copying the whole data of the backup target media which were recognized as backup targets to the backup destination media. When the copying of the whole data is finished, in step S2, for example, when the updating bit map table 56 is provided in the input/output control apparatus 54, the updating bit map table 56 is cleared, thereby preparing for the next updating backup.

Figure 12:
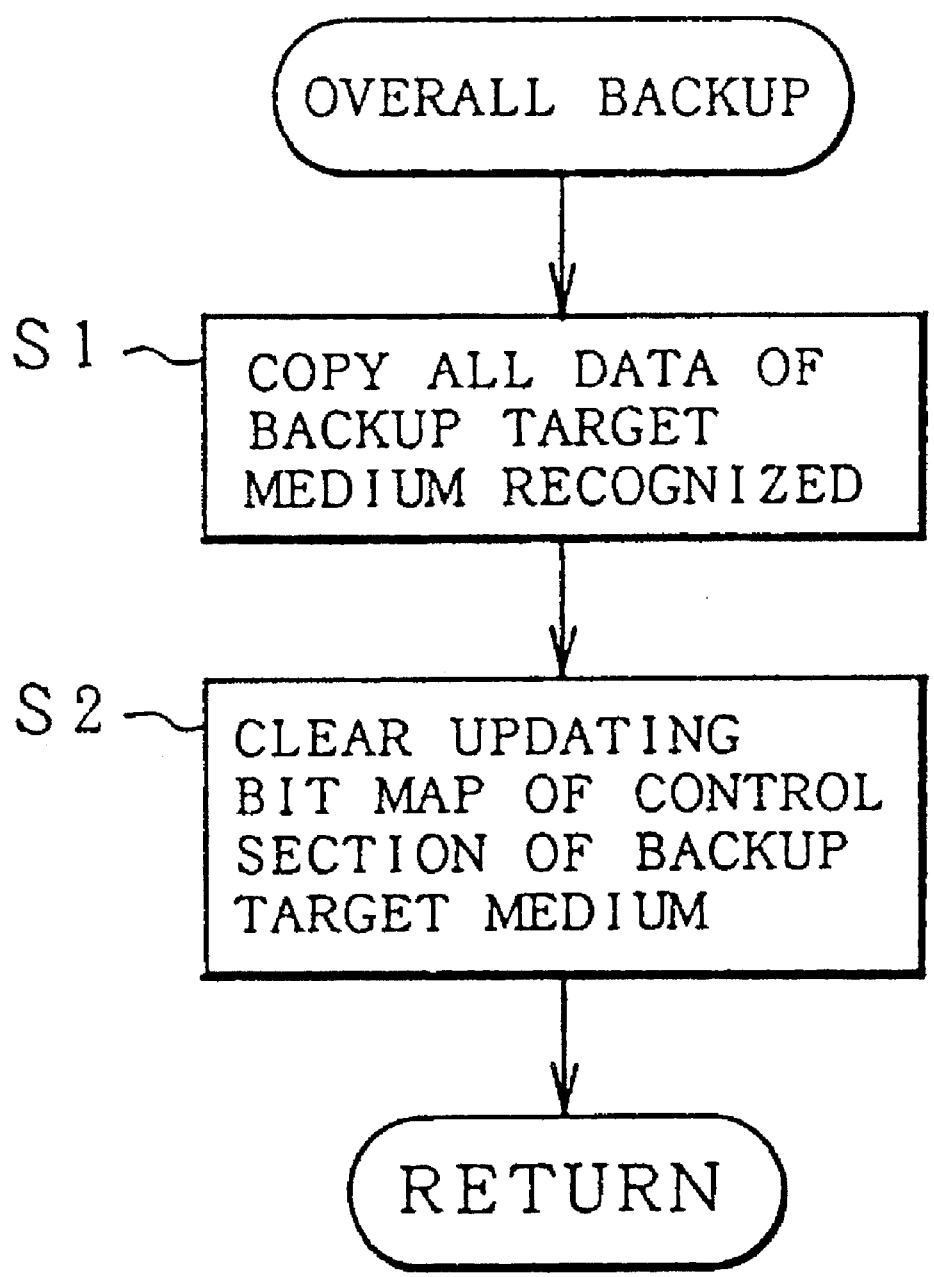
FIG. 12 is a flowchart showing an overall backup process.
Figure 13:
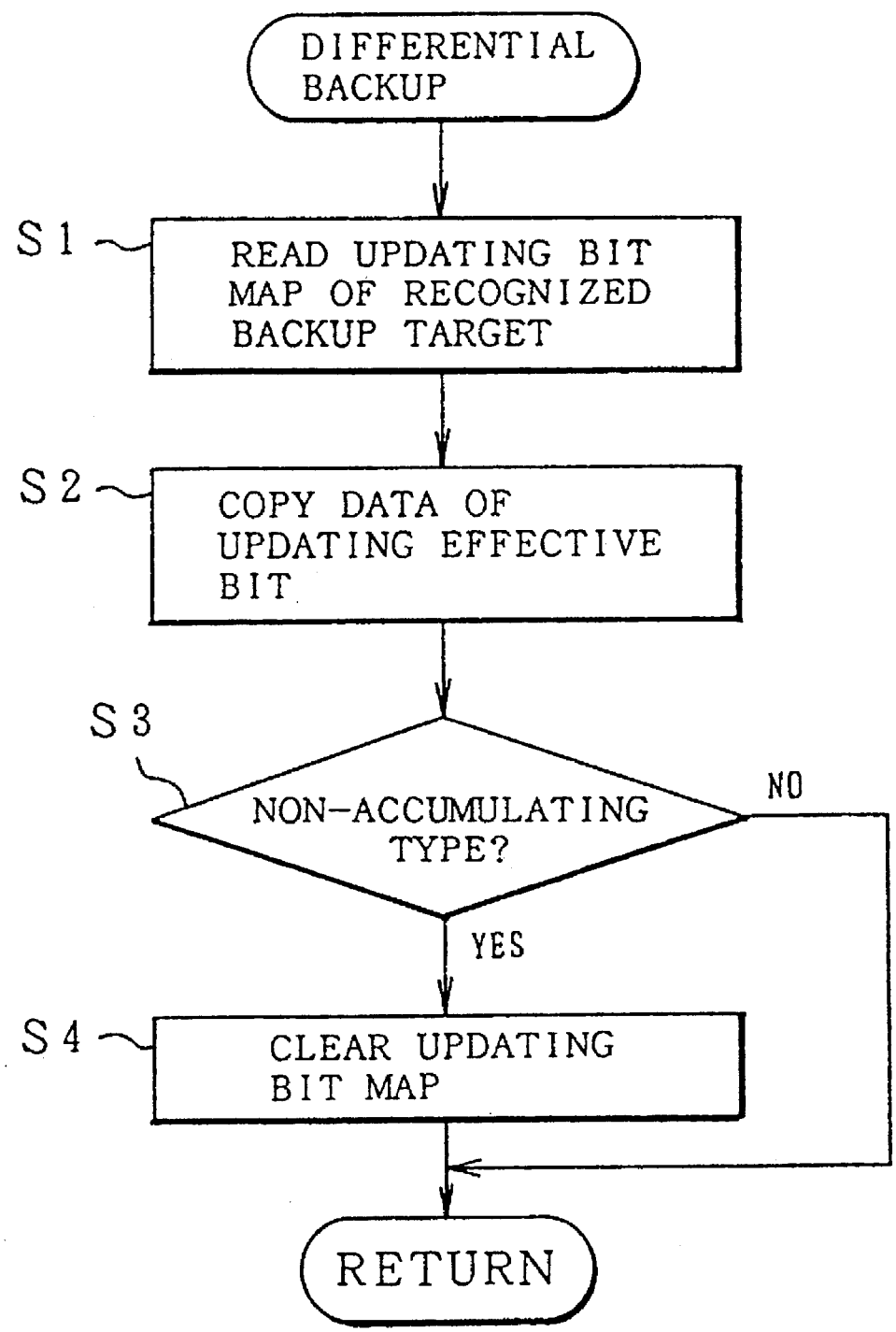
FIG. 13 is a flowchart showing a differential backup process.

A flowchart of FIG. 13 shows a differential backup process shown in step S5 in FIG. 11 as a sub-routine. In the differential backup process, first in step S1, the updating bit map of the backup target media which were recognized as backup targets in step S1 is read. In step S2, the data corresponding to the effective bits in which the bits are set to ON in the updating bit map table is extracted as updating data and is copied to the backup destination medium. In the next step S3, a check is made to see if the differential backup process is the non-accumulating type or not. If the non-accumulating type was set, the updating bit map table on the backup target medium side is cleared in step S4 and at the next backup process, only the updating data using the data which could be backed up this time can be extracted. On the other hand, in the case where the accumulating type has been set, the updating bit map is not cleared. Thus, in the accumulating type differential backup process, the backup data obtained by the whole backup process of FIG. 12 is set to a reference and the backup such that the accumulated updating data was extracted every differential backup after that.

Differential Backup of Accumulating Type and Non-Accumulating Type

Figure 14:
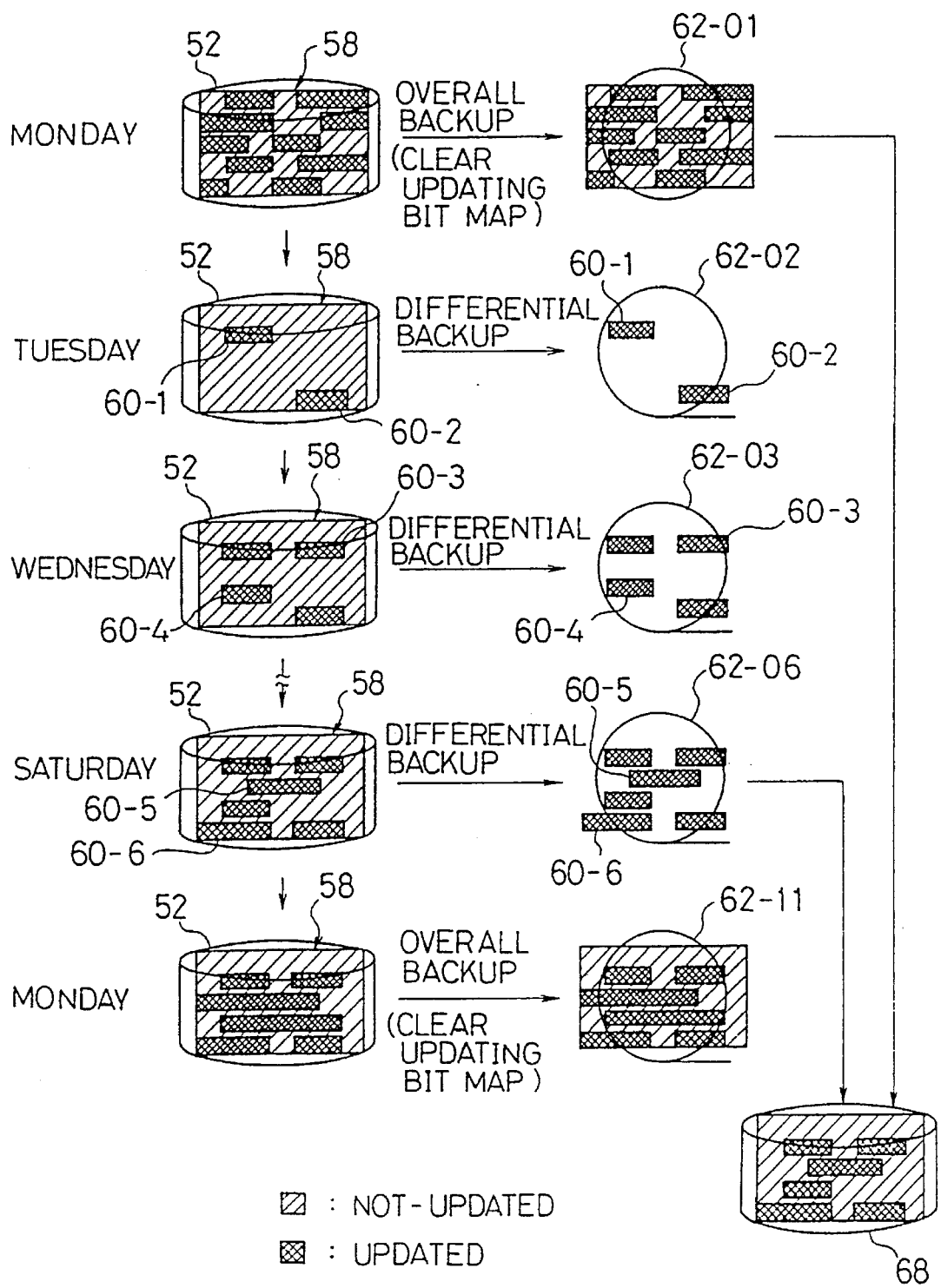
FIG. 14 is an explanatory diagram of an accumulating type differential backup process.

The accumulating type and non-accumulating type of the differential backup process shown in FIG. 13 are specifically described hereinbelow. FIG. 14 shows the differential backup process of the accumulating type. It is now assumed that the cycle of the backup is executed after the works from Monday to Saturday were finished. First, on first Monday, the whole backup process to copy all data in the effective region 58 in the backup target medium 52 to a backup destination medium 62-1 is executed. In this instance, the updating bit map on the backup target medium 52 side is cleared. On Tuesday, since it is known that the updating of two updating data 60-1 and 60-2 has been executed in the effective data region 58 from a state of the updating bit map, the differential backup to copy only the updating data 60-1 and 60-2 to a backup destination medium 62-02 is executed. In this case, the updating bit map on the backup target medium 52 side is not cleared. On Wednesday, further, updating data 60-3 and 60-4 are updated and the differential backup to copy the updating data 60-1 to 60-4 on both of Tuesday and Wednesday to a backup destination medium 62-03 is executed after that. With respect to Thursday and Friday, a similar differential backup is executed after that. With respect to Saturday, the differential backup is executed as shown in the diagram. By executing such a backup process on Monday to Saturday, the backup destination media 62-01 to 62-06 are obtained. When it is now assumed that the backup target medium 52 is a magnetic disk unit and the backup destination media 62-01 to 62-06 are magnetic tapes, an updating ratio of the backup target medium per week lies within a range of about 10 to 20%. Therefore, although the first differential backup takes about one to two minutes and the number of tapes is equal to one or two as the day of the week advances, in the differential backup process on Saturday, the time increases to about 10 minutes and the number of tapes increases to five or six. When such backup processes of one week of Monday to Saturday are finished, the whole backup is again executed on next Monday and the updating bit map is cleared. The above processes are repeated.

In the recovery process in the accumulating type differential backup, for example, in order to recover the data in a state on Saturday, it is sufficient to use the two media of the backup destination medium 62-01 of the whole backup data on Monday and the newest backup destination medium 62-06 obtained on Saturday. Therefore, in the accumulating type backup process, the number of media in the recovery process can be reduced and the media can be easily managed.

Figure 15:
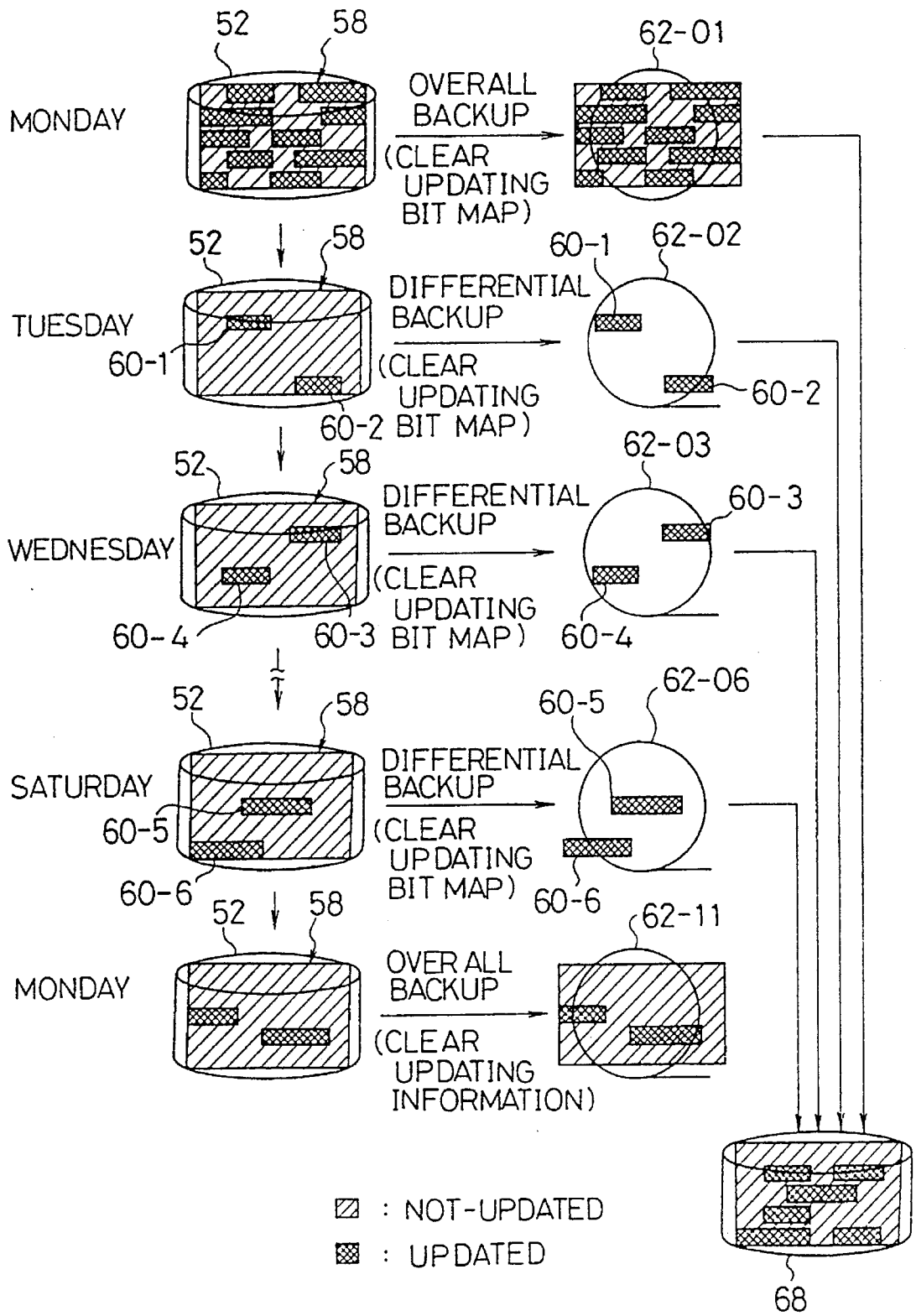
FIG. 15 is an explanatory diagram of a non-accumulating type differential backup process.

FIG. 15 shows an example of the case of the non-accumulating type differential backup process where the backup work is executed by setting a period of Monday to Saturday to one cycle in a manner similar to the case in FIG. 14. On first Monday, similar to the accumulating type in FIG. 14, the whole backup is executed and the updating bit map is cleared. FIG. 15 differs from the case of the accumulating type with respect to a point that with respect to a period of Tuesday to Saturday, the updating bit map is cleared every time a differential backup is obtained. Therefore, in the differential backup on Tuesday to Saturday, only the updating data which uses the whole backup or differential backup of the previous day as a reference is extracted and copied to the backup destination media 62-02 to 62-06.

In the recovery process using the medium obtained by the non-accumulating type backup process, for example, when the case where the data until Saturday is reconstructed is considered as an example, all of the backup destination media 62-01 to 62-06 obtained by a plurality of differential backups from the whole backup on Monday to Saturday must be used. In the non-accumulating type differential backup as mentioned above, for example, when it is now assumed that an updating ratio of the backup target medium in one week lies within a range of about 10–20%, the differential backup at each time on each day of the week takes about one to two minutes and the number of tapes is equal to one or two. The processing time and the number of tapes can be extremely reduced. In case of the recovery process, however, all of the media by the whole backup and a plurality of differential backups obtained until the recovery is executed must be used. The recovery time increases and the medium management is complicated. According to the backup control of the invention, efficient recovery process and medium management are executed by making the most of the advantages of such accumulating type and non-accumulating type differential backup processes and by suppressing the drawbacks of them as much as possible.

Updating Bit Map and Effective Region Bit Map

Figure 16:
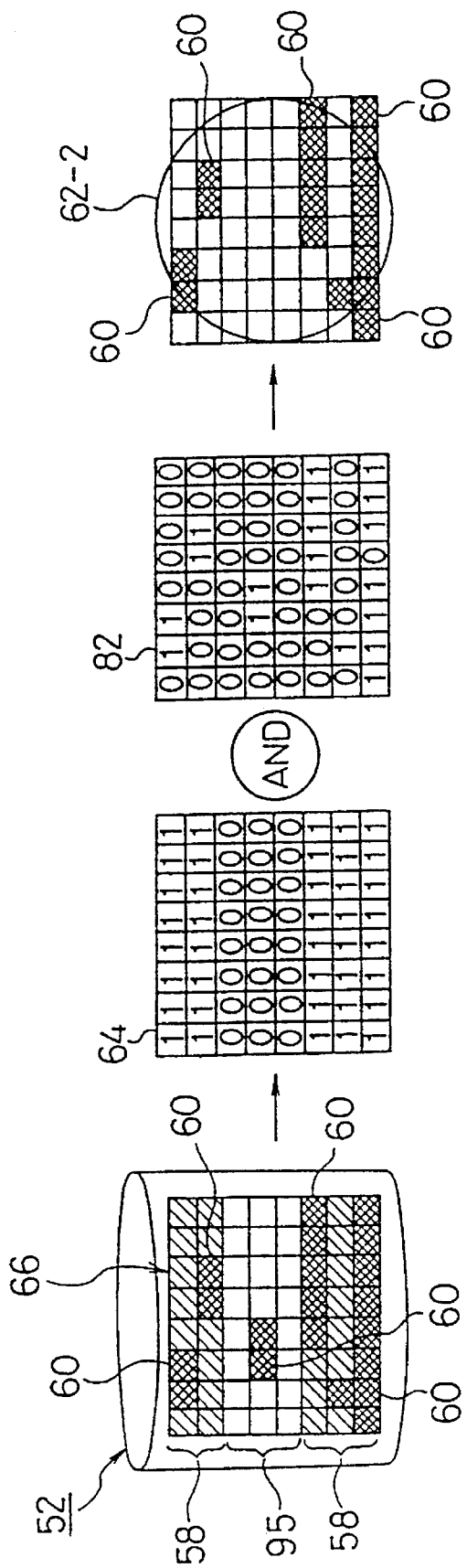
FIG. 16 is an explanatory diagram of a backup process using an effective region bit map table and an updating bit map table.

FIG. 16 shows a backup process using an effective region bit map table in addition to the updating bit map table by the backup processing section 36 shown in FIG. 3. According to a computer system using a virtual storing method, a bit map table indicating the effective region in which data is updated is stored into a volume table of contents (VTOC) of a magnetic disk unit constructing the backup target medium 52 shown in FIG. 3. In the backup process in FIG. 16, updating data to be copied is extracted as a backup by combining the effective region bit map table indicating the effective region in addition to the bit map table indicative of the position of the updating data. First, the effective region 58 is previously set in a data section 66 of the backup target medium 52 by a software process by the central processing unit 10. The effective region 58 has been recorded on the backup target medium 52 side as shown in an effective region bit map table 64. The central processing unit 10 performs the updating process with respect to only the data of the effective region 58 of the backup target medium 52 as shown in the updating data 60. However, there is also a case such that the updating is executed by a hardware for an invalid region 95 and the updating data 60 exists. The updating bit map table 82 detects the position of the updating data 60 in the backup target medium 52 by a hardware and records. Therefore, with respect to the updating data 60 of the invalid region 95, the effective bits 1 have been set on the updating bit map table 82.

In such a case where the updating bit map table 82 such as mentioned above is used as it is, the updating data 60 of the invalid region 95 is also copied to the backup destination medium 62 as unnecessary data. When the backup process is executed, the effective region bit map table 64 is read in addition to the updating bit map data 82. The AND of the bits at the same positions in the two bit map tables 64 and 82 is calculated and only the effective data at the positions at which the effective bits were obtained are copied to the backup destination medium 62. Thus, the updating data 60 of the invalid region 95 is excluded from the backup targets and a vain process such that unnecessary data is copied to the backup destination medium 62 can be omitted.

Merge Process

Figure 17:
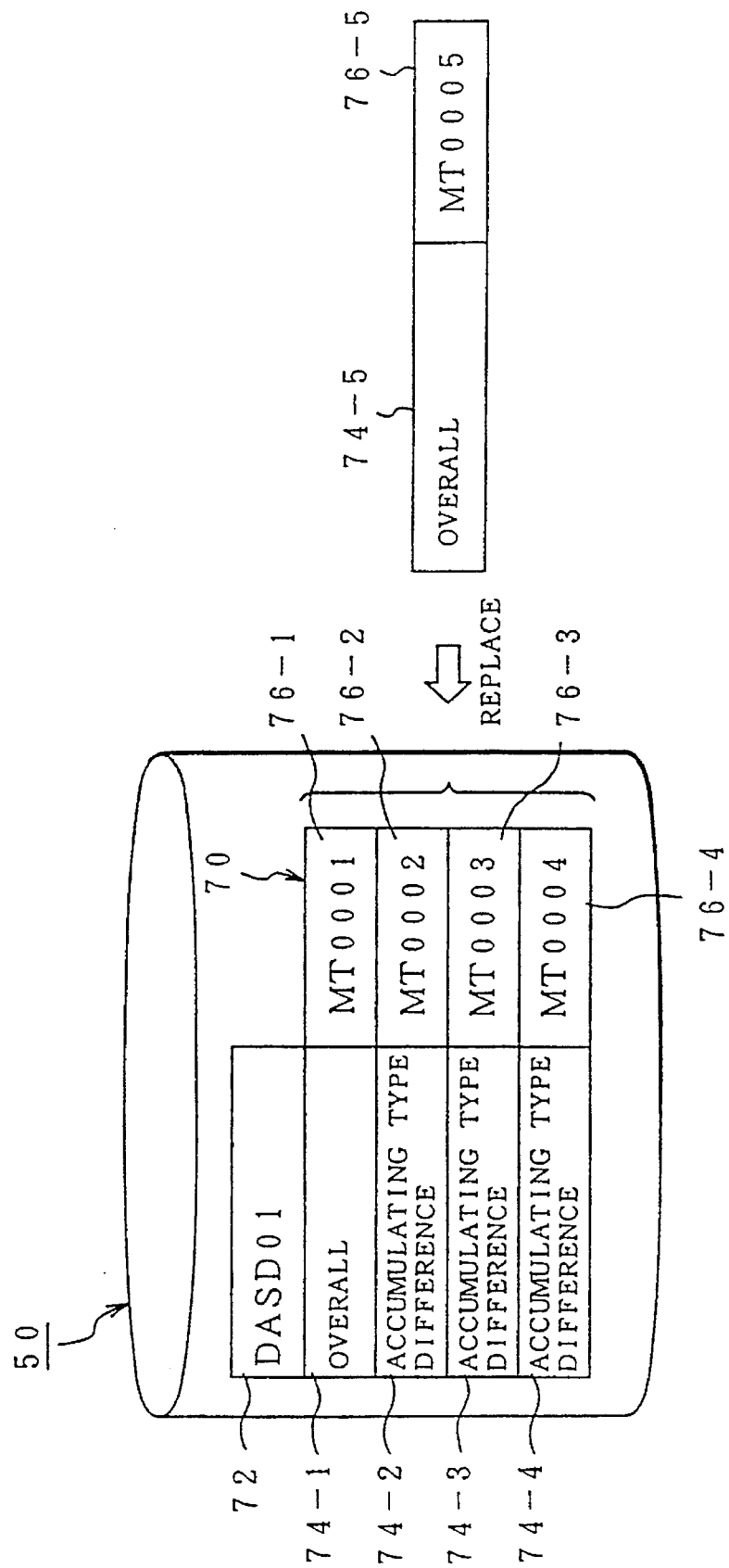
FIG. 17 is an explanatory diagram showing backup destination medium information as a target of a merge process of the invention.
Figure 18:
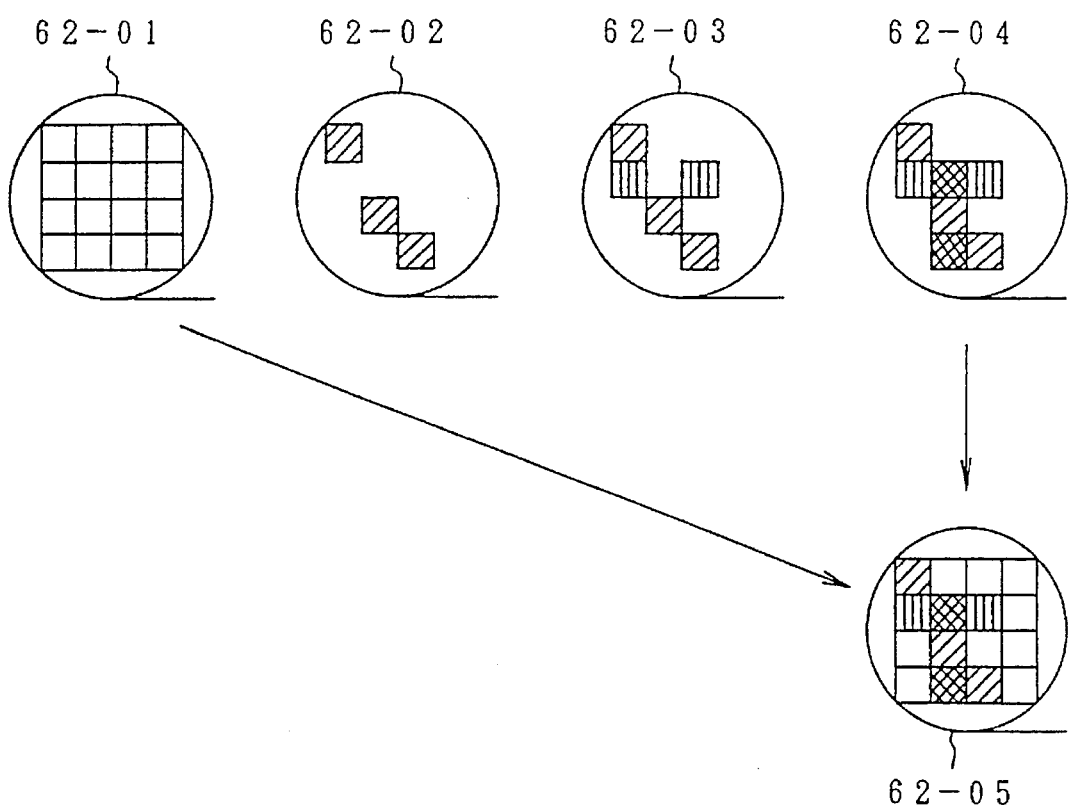
FIG. 18 is an explanatory diagram of an accumulating type merge process based on the backup destination medium information of FIG. 17.

A merge process in a state in which a plurality of magnetic tapes as backup destination media are obtained will now be described according to the backup process shown in FIG. 11. FIG. 17 shows a management information table of the backup destination medium with respect to a certain backup target medium as a target of the merge process. That is, as for identification (ID=DASD01) of the backup target medium, as shown in backup style identifiers 74-1 to 74-4, it is recognized that the backup of ID=MT0001 to MT0004 shown in the ID numbers 76-1 to 76-4 of the backup destination media which were obtained by three accumulating type differential backups have been finished subsequent to one whole backup. With respect to a state in which the backup has already been finished, as shown in FIG. 18, two media of the whole backup destination medium 62-01 which is oldest among the backup destination media 62-01 to 62-04 of ID=MT0001 to MT0004 with regard to the time and the newest accumulating type differential backup destination medium 62-04 are copied and synthesized, thereby forming one whole backup destination medium 62-05. As for the copy in this case, when there are the effective bits in the same position for each updating bit map of the whole backup destination medium 62-01 and the newest accumulating type differential backup destination medium 62-04, it is sufficient to extract the data corresponding to the newest effective bit and to copy and combine them. Further, when the one whole backup destination medium 62-05 is obtained by the merge process, an identifier 74-5 which collects four information is set as a whole backup in the management information table 70 shown in FIG. 17 and the replacing of the table information of the medium identification ID (=MT0005) is executed.

Figure 19:
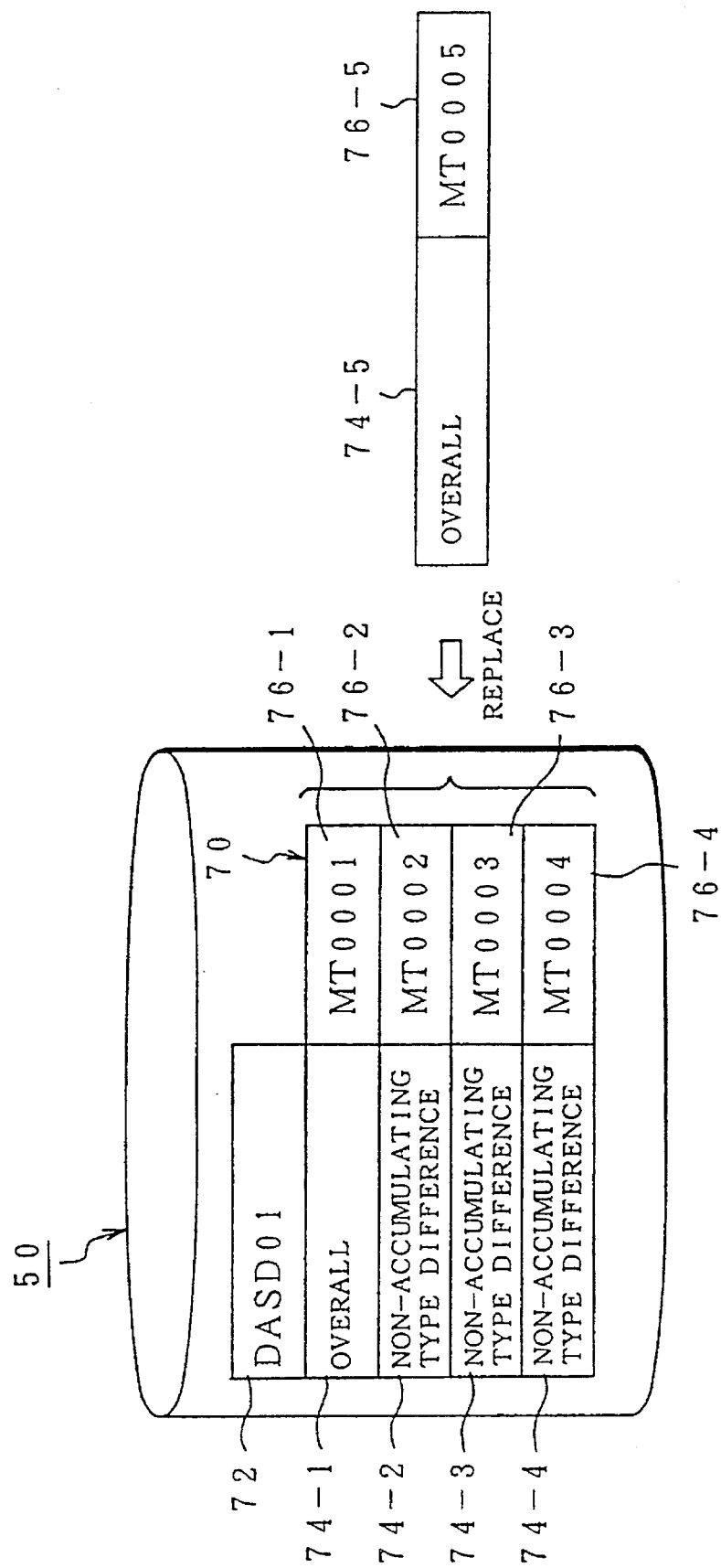
FIG. 19 is an explanatory diagram of the backup destination medium information as a target of the merge process of the invention.

FIG. 19 shows another embodiment of a management information table of the backup destination medium as a target of the merge process. FIG. 19 relates to a case where the remaining three differential backups subsequent to the one whole backup are of the non-accumulating type. The merge process in this case is executed so as to read all of the whole backup destination medium 62-01 and the remaining three differential backup destination media 62-01 to 62-04 and to copy and combine them. In the copying and combining operations, the newest one of the updating data existing at the same position is extracted and copied to the whole backup destination medium 62-05.

Figure 20:
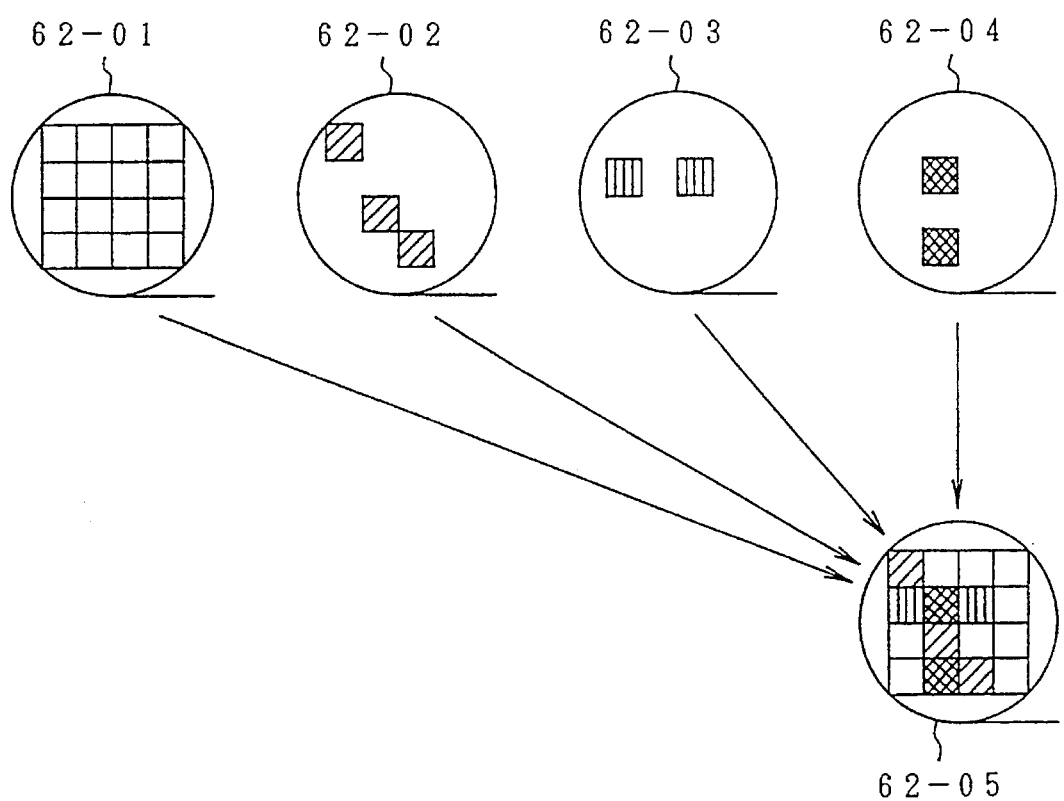
FIG. 20 is an explanatory diagram of a non-accumulating type merge process based on the backup destination medium information of FIG. 19.
Figure 21:
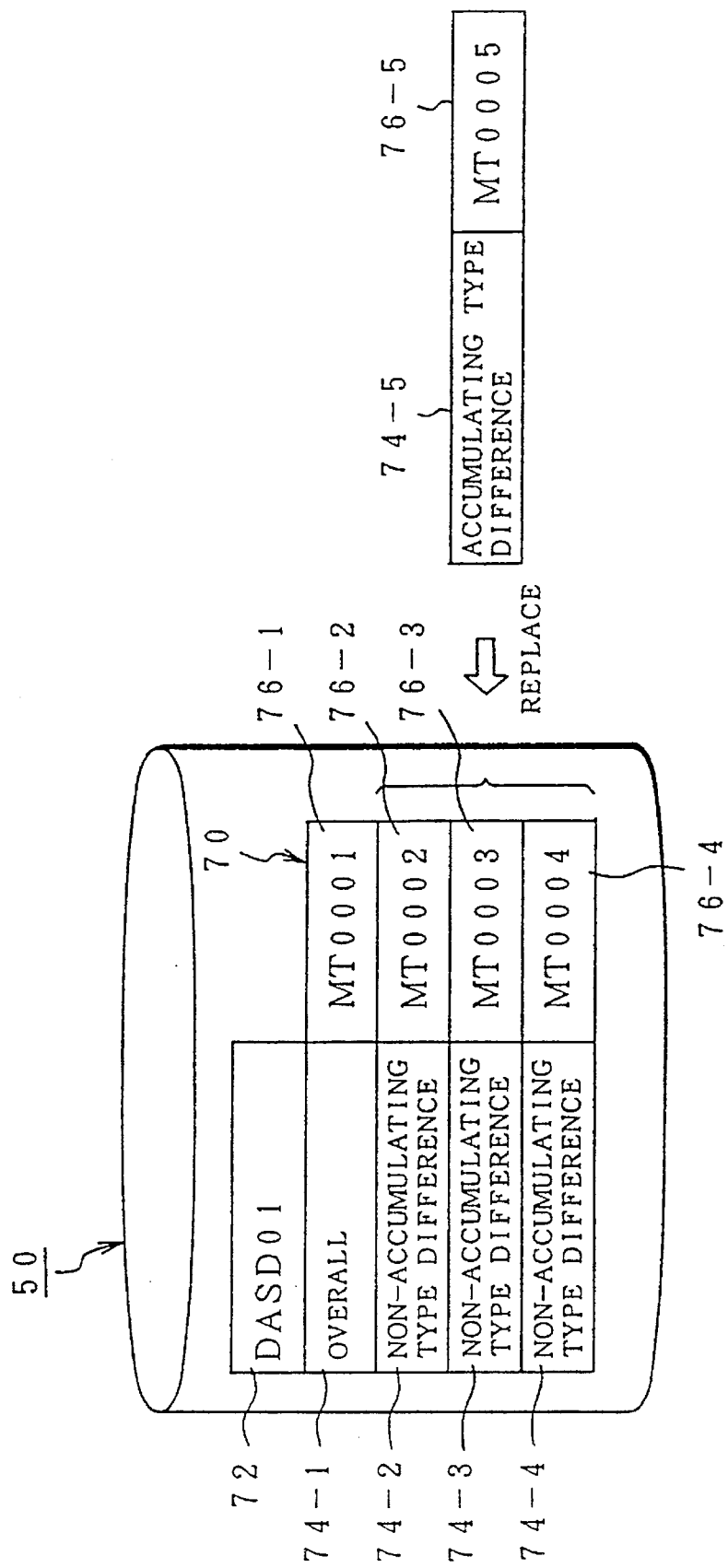
FIG. 21 is an explanatory diagram showing the backup destination medium information as a target of the merge process of the invention.
Figure 22:
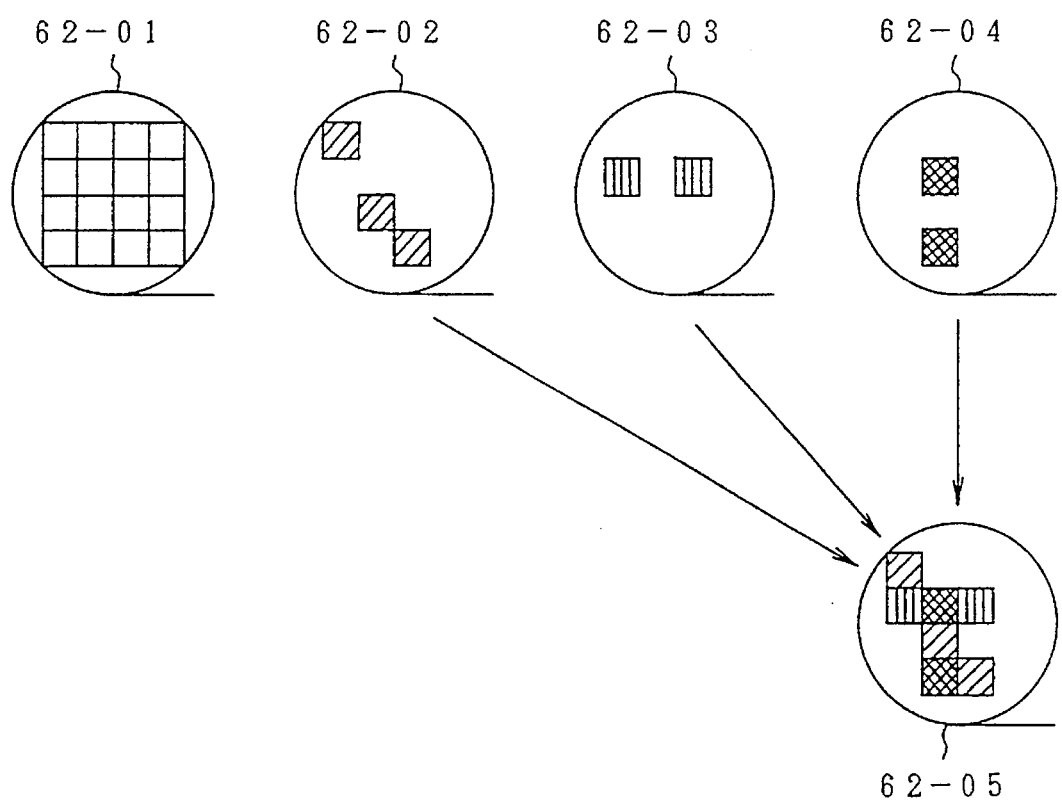
FIG. 22 is an explanatory diagram of another non-accumulating type merge process based on the backup destination medium information of FIG. 21.

FIG. 21 shows the management information table 70 which is used for another process of the merge process using media of the three non-accumulating type differential backups shown in FIG. 19. In this instance, as shown in FIG. 22, it is characterized in that the three non-accumulating type differential backup destination media 62-02 to 62-04 are merge processed, thereby forming one accumulating type differential backup destination medium 62-05. The above example relates to a case where there is no surplus time for the merge process. In the case where there is no time to form one whole backup destination medium 62-05 as shown in FIG. 20 including the whole backup destination medium 62-01, the non-accumulating type differential backup destination media are collected to one accumulating type differential backup destination medium. If there is a surplus time, as shown in FIG. 18, it is sufficient to execute the merge process using the whole backup destination medium and one accumulating type differential backup destination medium 62-05 formed in FIG. 22.

Figure 23:
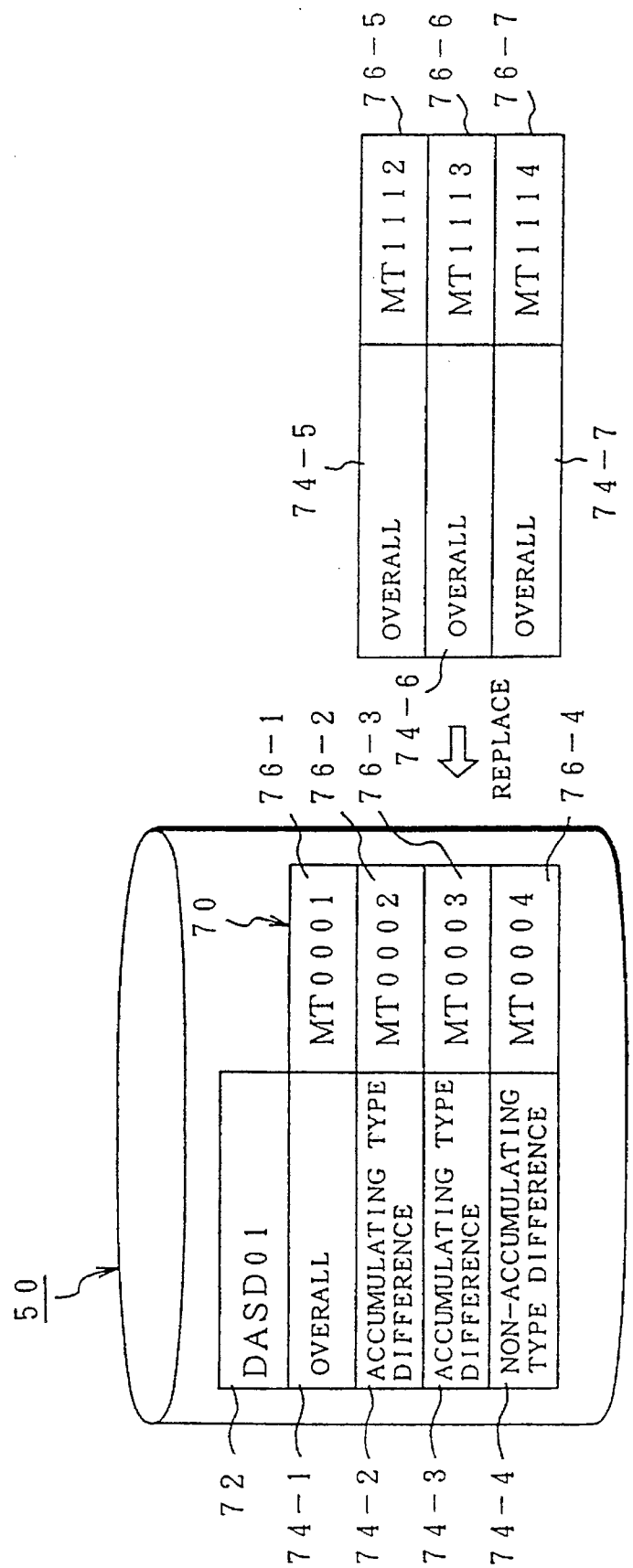
FIG. 23 is an explanatory diagram showing the backup destination medium information as a target of the merge process of the invention.
Figure 24:
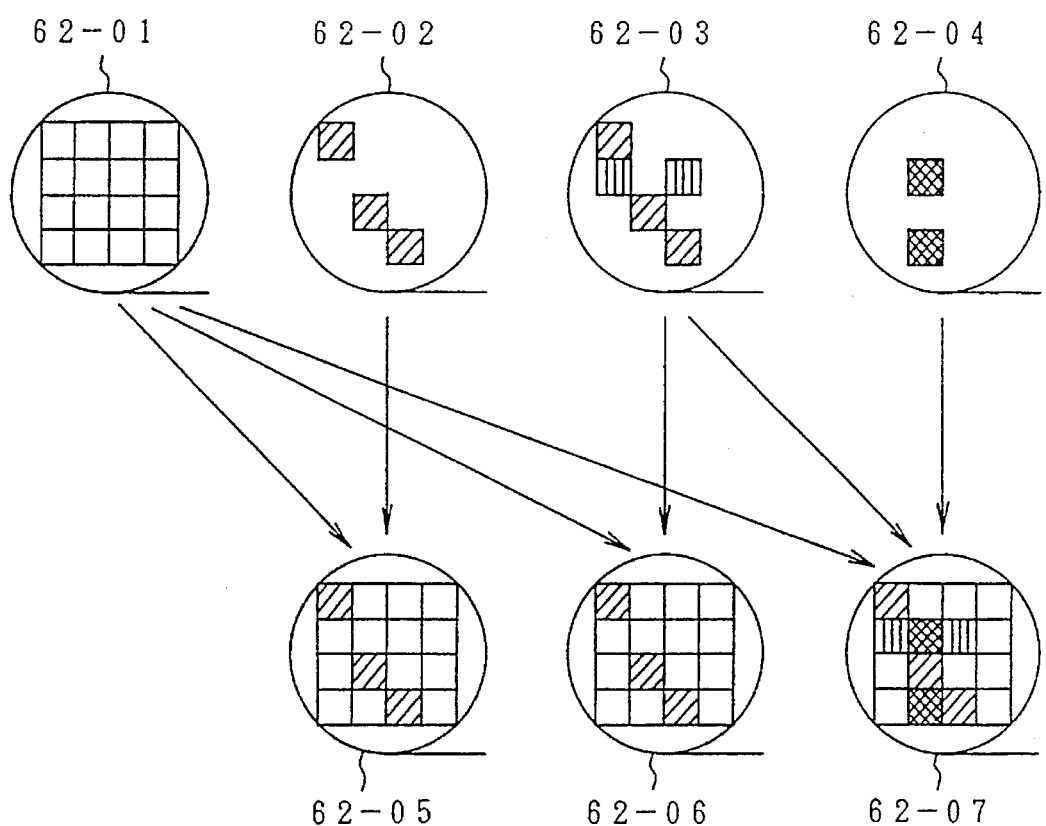
FIG. 24 is an explanatory diagram of a mixed type merge process based on the backup destination medium information of FIG. 23.

FIG. 23 shows another example of the management information table 70 of the backup destination medium as a target of the merge process. This example relates to a case where the accumulating type differential backup and the non-accumulating type differential backup mixedly exist. FIG. 24 shows the merge process in the case where the accumulating type and non-accumulating type differential backups mixedly exist. With respect to the first whole backup destination medium 62-01 and the next accumulating type differential backup destination medium 62-02, both of them are merged, thereby forming the whole backup destination medium 62-05. Subsequently, the whole backup destination medium 62-01 and the third accumulating type differential backup destination medium 62-03 are integrated, thereby forming the whole backup destination medium 62-06 at this time point. Further, three of the whole backup destination medium 62-01, the accumulating type differential backup destination medium 62-03, and the last non-accumulating type differential backup destination medium 62-04 are merged, thereby forming the whole backup destination medium 62-07 of that time point. As for the whole backup destination medium 62-05 to 62-07 which were newly formed, as shown on the right side in FIG. 23, new identifiers and IDs of the backup destination media are formed, thereby executing the replacement.

Figure 25:
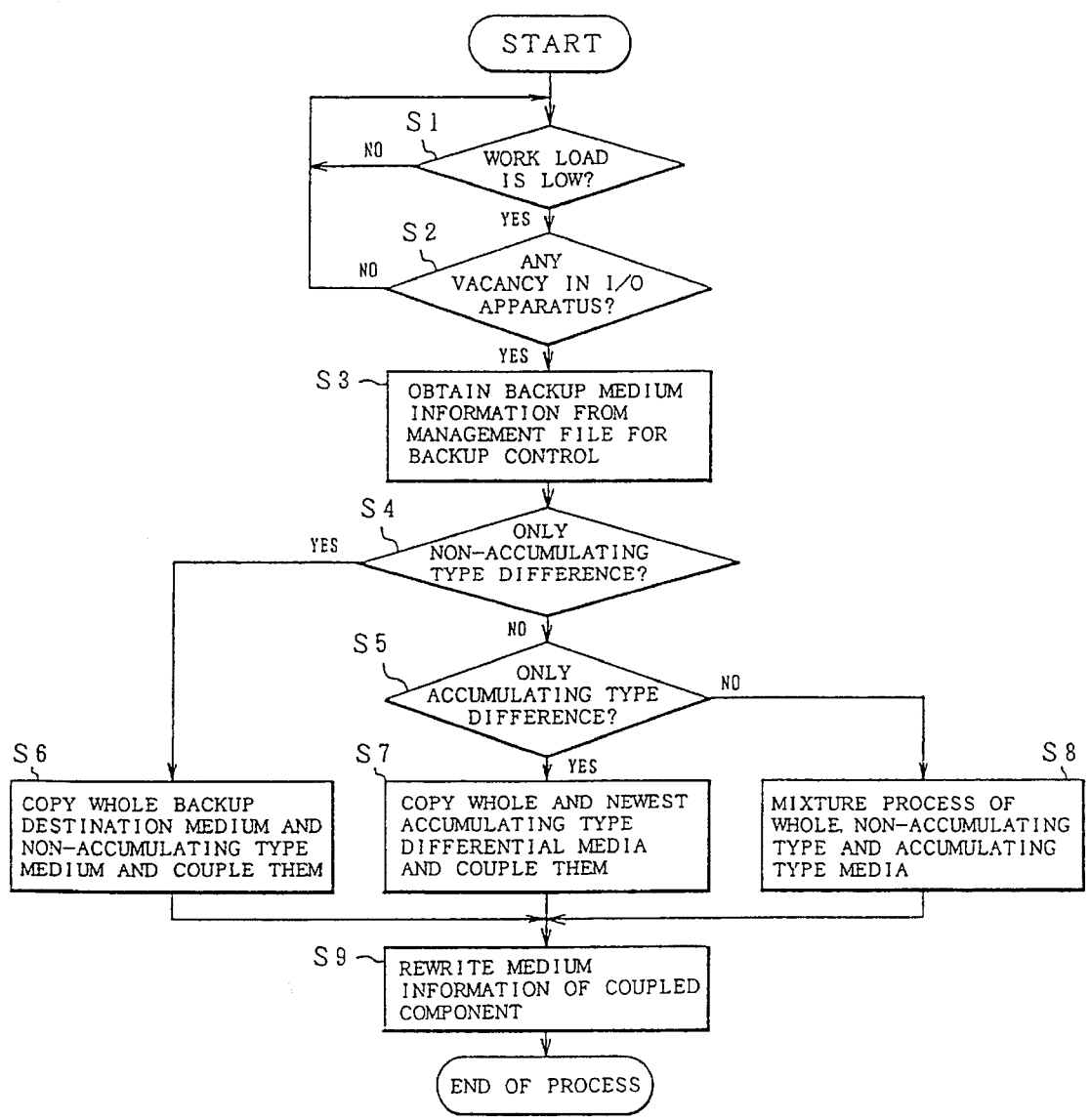
FIG. 25 is a flowchart showing the merge process of the invention.

A flowchart of FIG. 25 shows the merge process according to the present invention. In step S1, a check is first made to see if a work load in the computer system is low or not. If the work load is low, a check is made in step S2 to see if there is any vacancy in an input/output apparatus for the backup process, for example, a magnetic tape unit or not. If YES, the merge processes in step S3 and subsequent steps are executed. The merge process obtains information with respect to the backup destination media as marge targets from the management file 50 for a backup control in step S3. Namely, the management information table 70 regarding the backup destination media as shown in FIG. 17, 19, 21, or 23. In step S4, a check is made to see if the differential backup destination media included in the merge targets are only the non-accumulating type or not. In case of only the non-accumulating type, the merge process such that the whole backup destination medium and all of the non-accumulating type differential backup destination media are copied and combined is executed in step S6. In case of not only the non-accumulating type in step S4, a check is made in step S5 to see if the media are only the accumulating type or not. In case of only the accumulating type, the merge process such that the whole backup destination medium and the newest accumulating type differential backup destination medium are copied and combined is executed in step S7. Further, in the case where the media are not only the non-accumulating type and not only the accumulating type, they are the mixed mingling type. Therefore, the processing routine advances to step S8 and the mixture process of the whole non-accumulating type and the accumulating type, as shown in, for example, FIG. 24 is executed. When the merge process in step S6, S7, or S8 is finished, the rewriting of the management information table regarding the backup target media which were read in step S3 is executed in step S9.

Recovery Process

Figure 26:
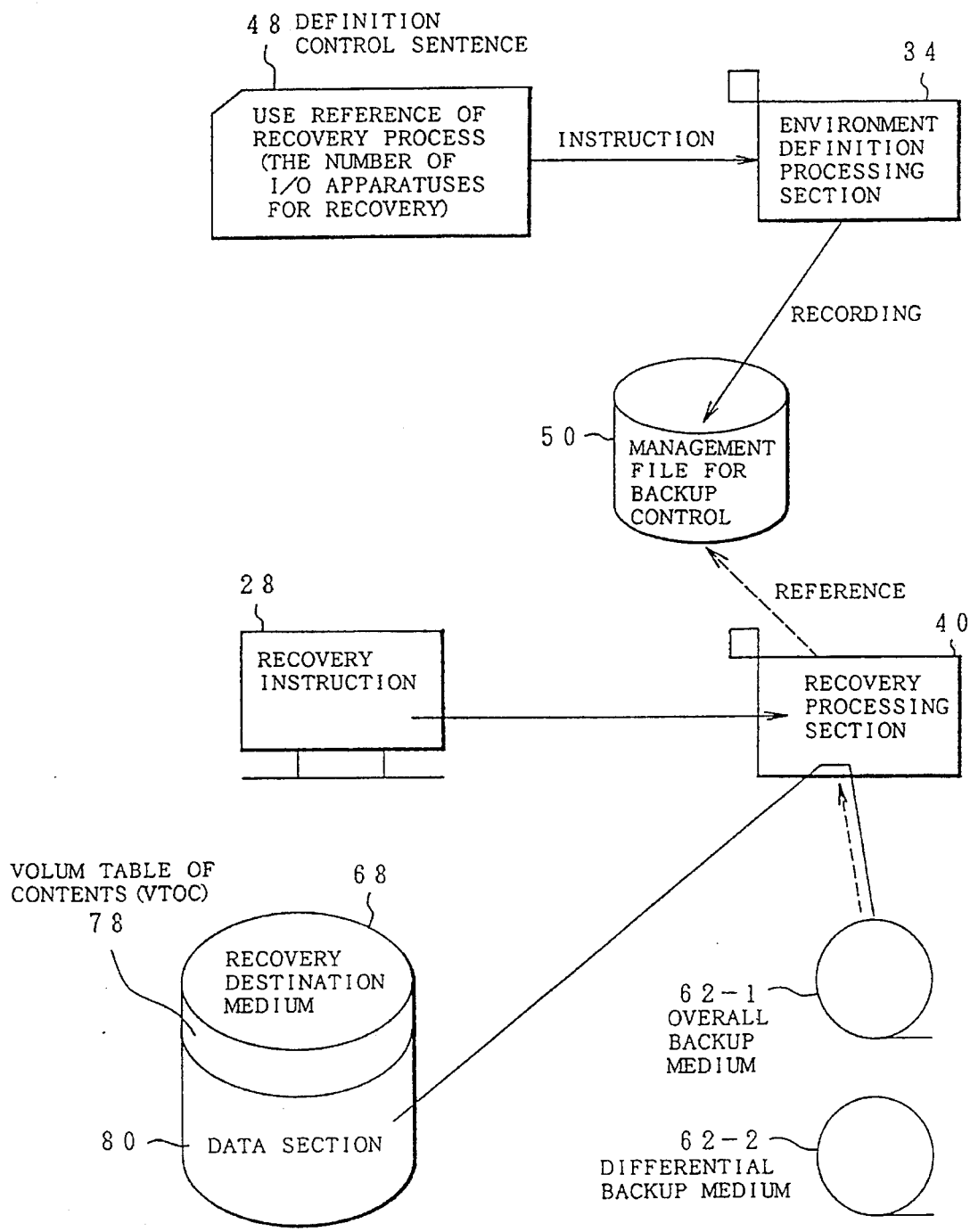
FIG. 26 is an explanatory diagram showing a function of a recovery process according to the invention.

FIG. 26 is an explanatory diagram showing functions of a recovery process in the backup processing control of the invention. The recovery process in FIG. 26 is executed by an recovery instruction from the operator console 28 to the recovery processing section 40. The use reference of the recovery process by the definition control sentence 48 is previously formed for the recovery process and is instructed to the environment definition processing section 34. The use reference of the recovery process is previously registered in the management file 50 for backup control. As a use reference of the recovery process which is instructed by the definition control sentence 48, for example, there is the number of I/O apparatuses of the backup destination medium which can be used for recovery. Namely, according to the recovery process of the invention, either one of the sequential process and the parallel process is executed in dependence on whether there are one or a plurality of I/O apparatuses of the recovery destination media which can be used at the recovery process. Therefore, the number of I/O apparatuses of the backup destination medium which can be used for the recovery is defined as a use reference.

Figure 27:
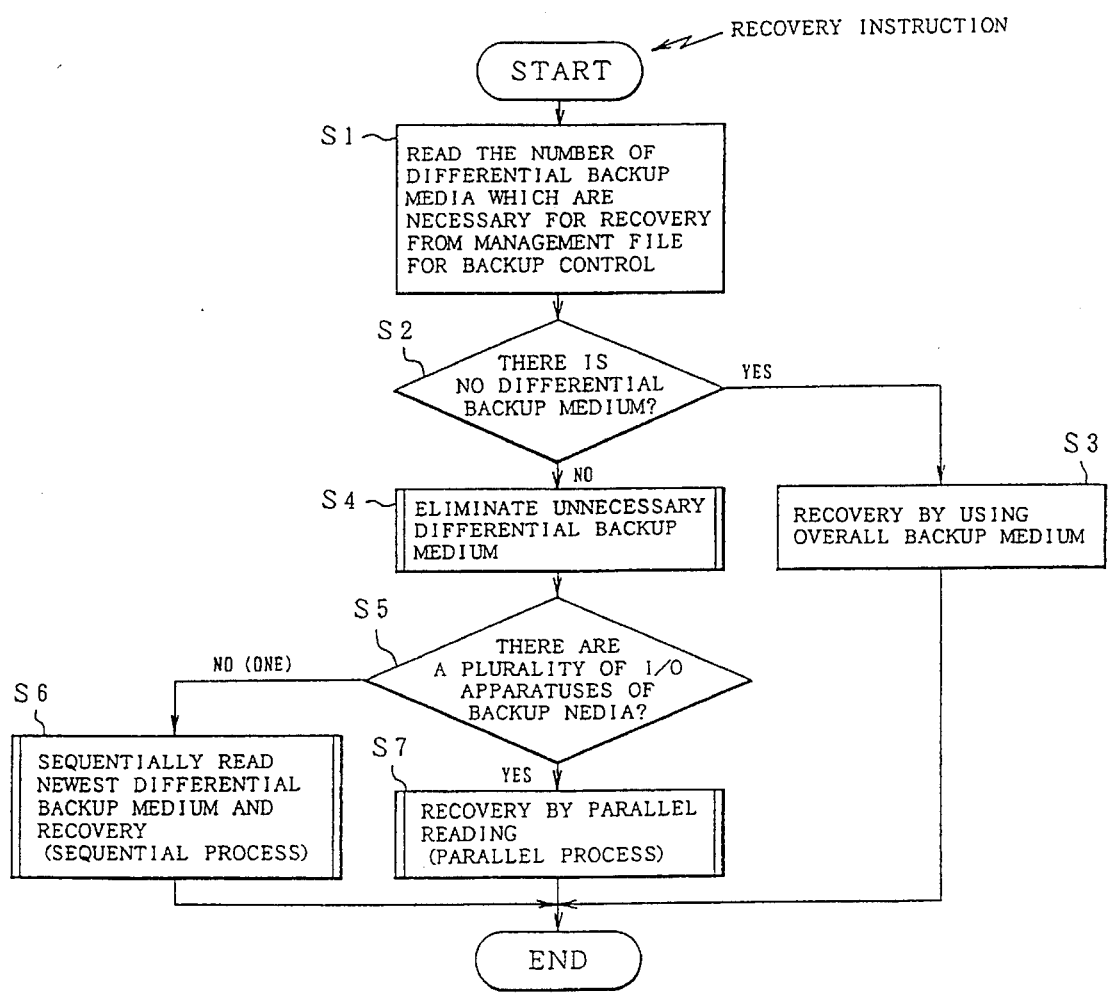
FIG. 27 is a flowchart showing a main routine of the recovery process of the invention.

A flowchart of FIG. 27 shows a main routine of the recovery process by the recovery processing section 40 in FIG. 26. When receiving a recovery instruction due to the system down or the like, the recovery processing section 40 is activated,. The number of differential backup destination media which are needed for recovery is first read out from the management file 50 for backup control in step S1. Subsequently in step S2, a check is made to see if there is a differential backup destination medium which is necessary for recovery or not. If there is no differential backup destination medium, the processing routine advances to step S3 and the ordinary recovery process using only the whole backup destination medium is executed. When there is the differential backup destination medium in step S2, the processing routine advances to step S4 and the unnecessary medium eliminating process to eliminate unnecessary media from a plurality of differential backup destination media is executed. Subsequently in step S5, a check is made to see if the number of I/O apparatuses which are used for reading from the backup destination medium is a plural number or not. In case of one I/O apparatus, the processing routine advances to step S6 and the sequential process to sequentially read from the newest differential backup destination medium and to recover is executed. On the other hand, when there are a plurality of I/O apparatuses, the parallel process to read the data of a plurality of backup destination media in parallel and to recover is executed in step S7.

Figure 28:
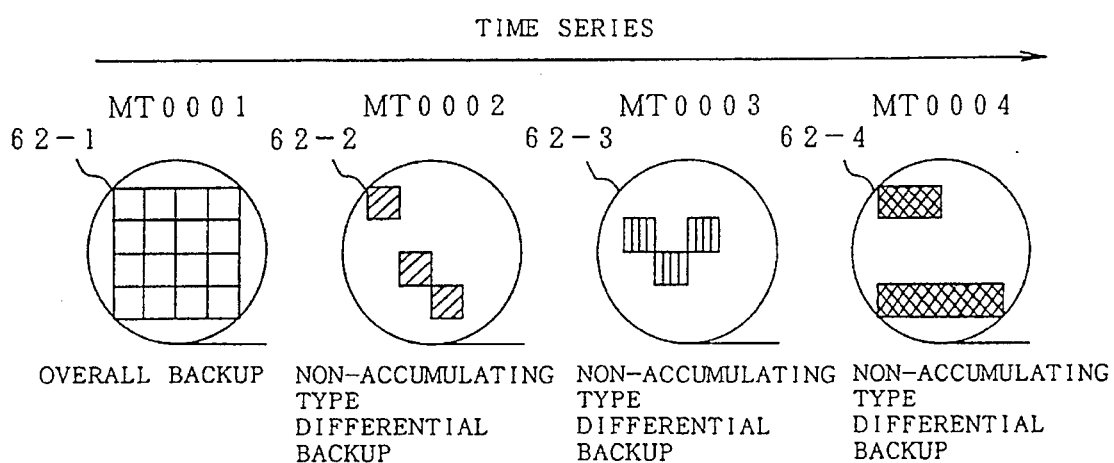
FIG. 28 is an explanatory diagram of a backup destination medium to execute a medium eliminating process by the recovery process.
Figure 29:
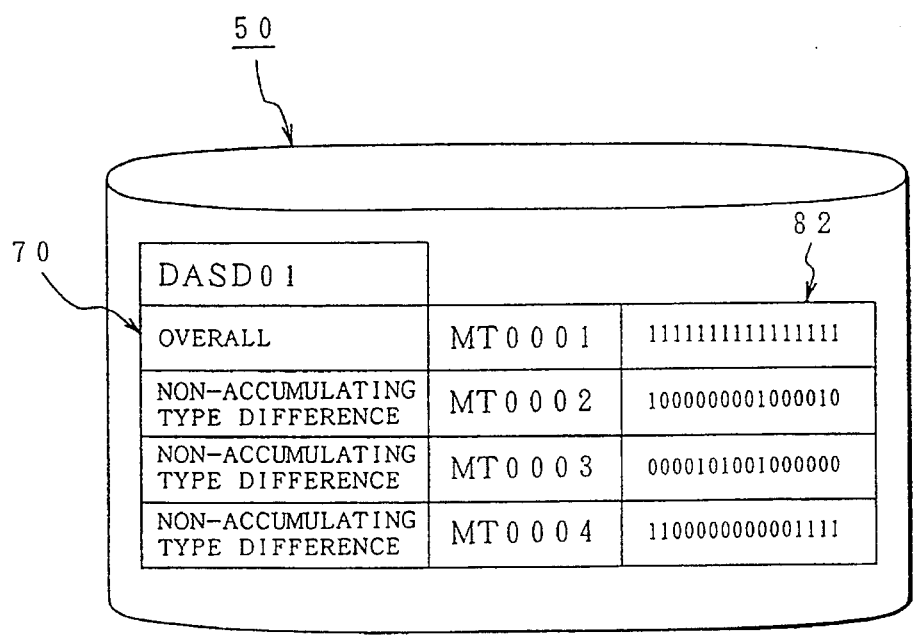
FIG. 29 is an explanatory diagram of a management information table corresponding to the medium of FIG. 28.
Figure 30:
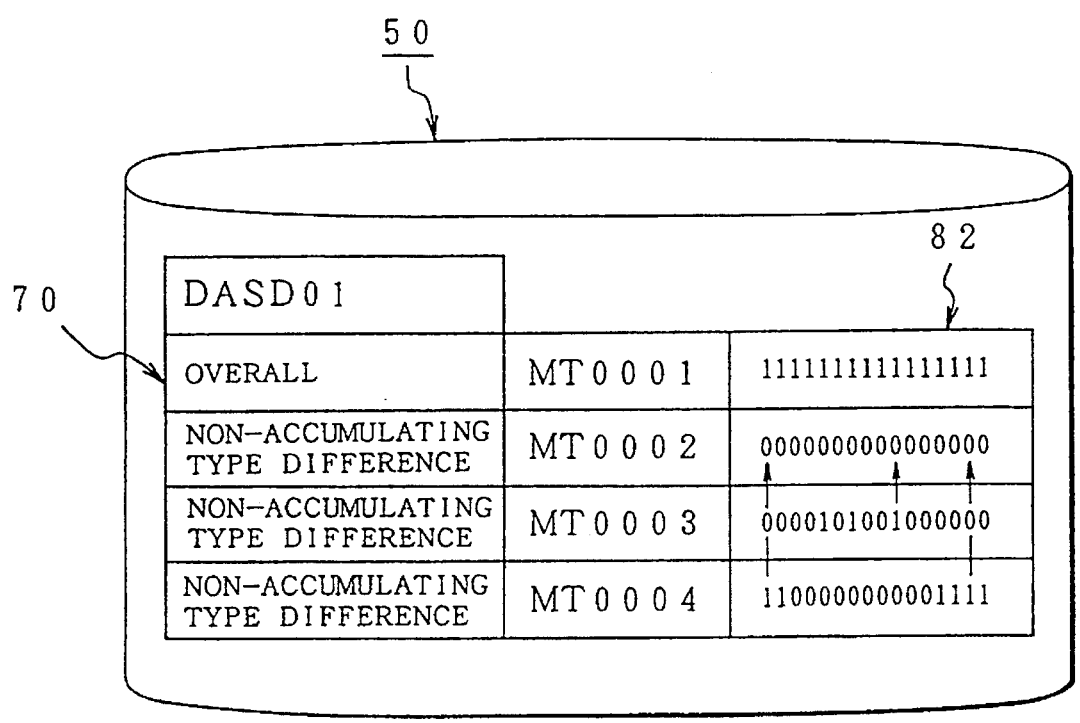
FIG. 30 is an explanatory diagram showing a bit invalidating process of the management information table in the medium process.

FIG. 28 shows an example of backup destination media which are targets of the unnecessary medium eliminating process in step S4 in FIG. 27. When the unnecessary medium eliminating process is executed, the management file 50 for backup control is referred with respect to, for example, four backup destination media 62-1 to 62-4 shown in FIG. 28 and the management information table 70 shown in FIG. 29 and the updating bit map 82 which is added to the management table 70 are referred. With respect to the updating bit map table 82, as shown in FIG. 30, the effective bits 1 in the previous bit map data corresponding to the effective bits 1 in the newest updating bit map data indicative of the medium identification ID (=MT0004) are turned off to invalid bits 0 as shown by arrows. As for the effective bits 1 regarding the medium identification ID (=MT0003), the effective bits 1 at the same positions as those in the previous updating bit map are turned off to the invalid bits 0 as shown by arrows. As a result, all bits in the updating bit map table of the medium identification ID (=MT0002) are set to the invalid bits 0. Therefore, the updating data shown by the effective bits 1 of the medium identification ID (=MT0002) has been rewritten by the updating data of the effective bits 1 by the medium identification ID (=MT0003, MT0004) after that. The effective updating data which needs the writing at the time of recovery doesn't exist. Therefore, the medium identification ID (=MT0002) is eliminated from the medium which is used for recovery.

Figure 31:
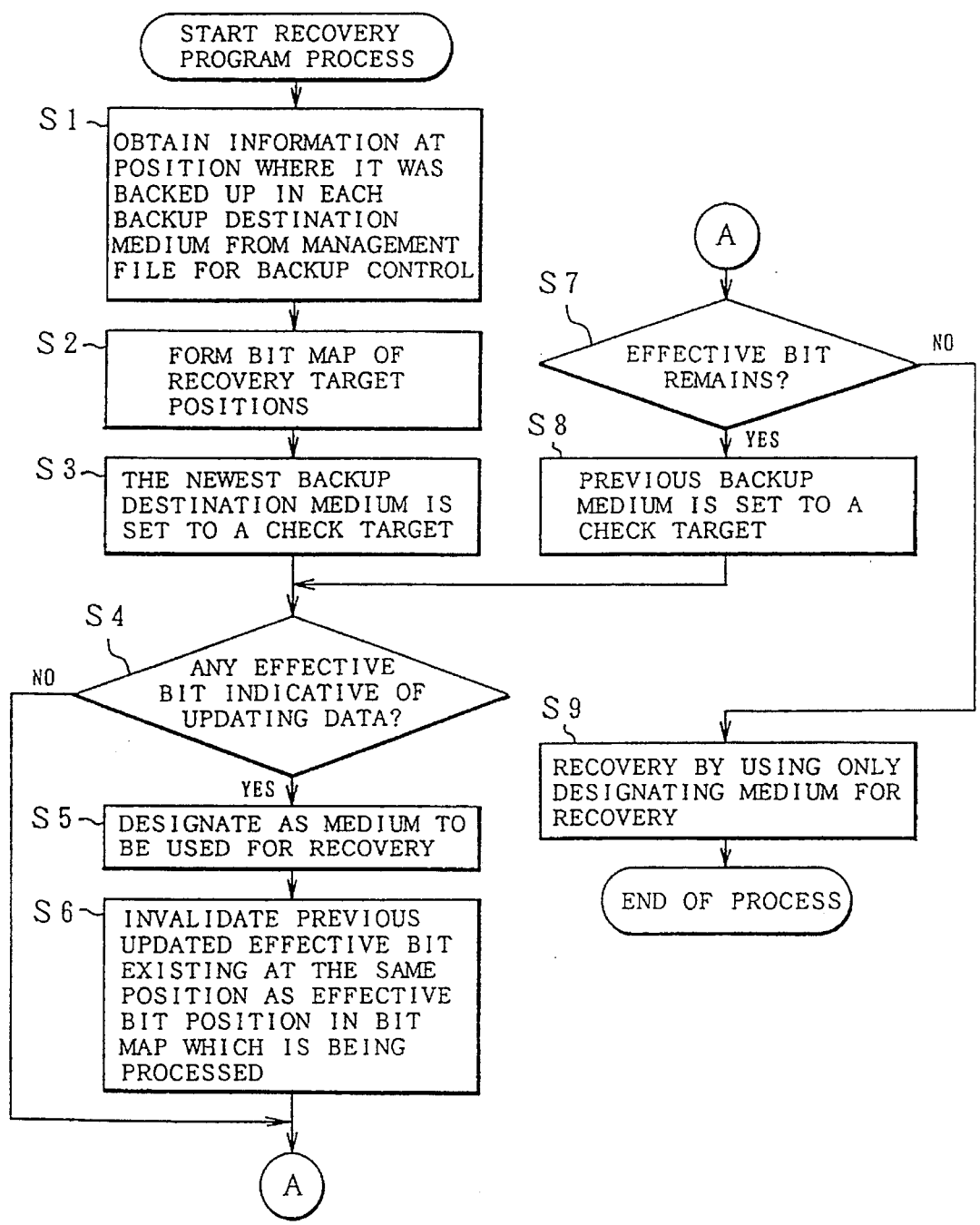
FIG. 31 is a flowchart showing an eliminating process of an unnecessary medium according to the invention.

A flowchart of FIG. 31 shows an unnecessary medium eliminating process of the invention. First, in step S1, information indicating the location of the updating data which is backed up in each backup destination medium is obtained from the management file 50 for backup control. A bit map table is formed in step S2. The process in step S1 is unnecessary in the case where information has already been stored in the management file 50 for backup control in a format of the bit map table from the beginning. In step S3, a newest backup destination medium is set to a check target. Subsequently, a check is made in step S4 to see if there is an effective bit in the updating bit map table of the backup destination medium as a check target or not. If there is an effective bit, the medium is designated as a medium which is used for recovery in step S5. In step S6, the effective bits in the previous updating bit map table existing at the same positions as effective bits 1 in the updating bit map table of the backup destination medium which is being processed are invalidated. A check is made in step S7 to see if an effective bit remains in the bit map table or not. If YES, in step S8, the previous backup destination medium is set to a new check target and the processes in steps S4 to S6 are repeated. If no effective bit remains in step S7, the processing routine advances to step S9 and the recovery process is executed by using only the designation medium which was designated for recovery.

Recovery Sequential Processes

Figure 32:
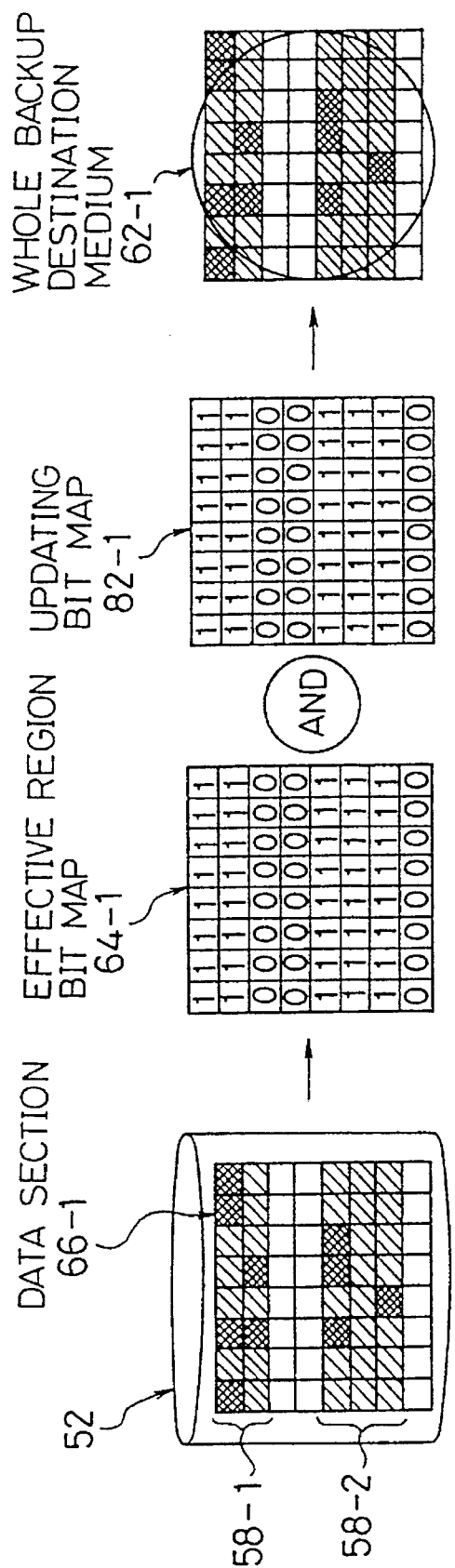
FIG. 32 is an explanatory diagram of a whole backup which is used in the recovery process which is executed in the sequential reading.

Sequential processes in the case where only one I/O apparatus of the backup destination medium which can be used in the recovery process shown in step S6 of FIG. 27 is provided will now be described. FIG. 32 shows a situation of a whole backup which is used for the recovery sequential process. That is, in the whole backup, the updating data at the position in which the effective bit is set by the AND of an effective region bit map table 64-1 indicating the effective region of the backup target medium 52 and an updating bit map table 82-1 indicating the position of the updating data in the table 64-1 is copied to a whole backup destination medium 62-1.

Figure 33:
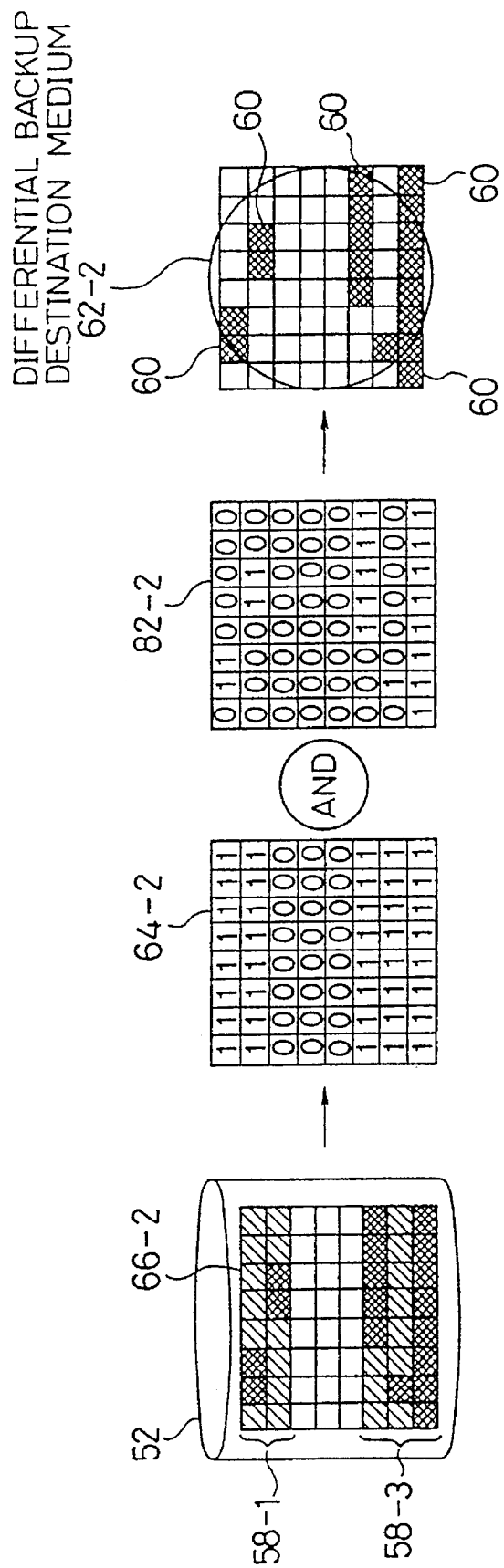
FIG. 33 is an explanatory diagram of a differential backup which is used in the recovery process which is executed in the sequential reading.
Figure 34:
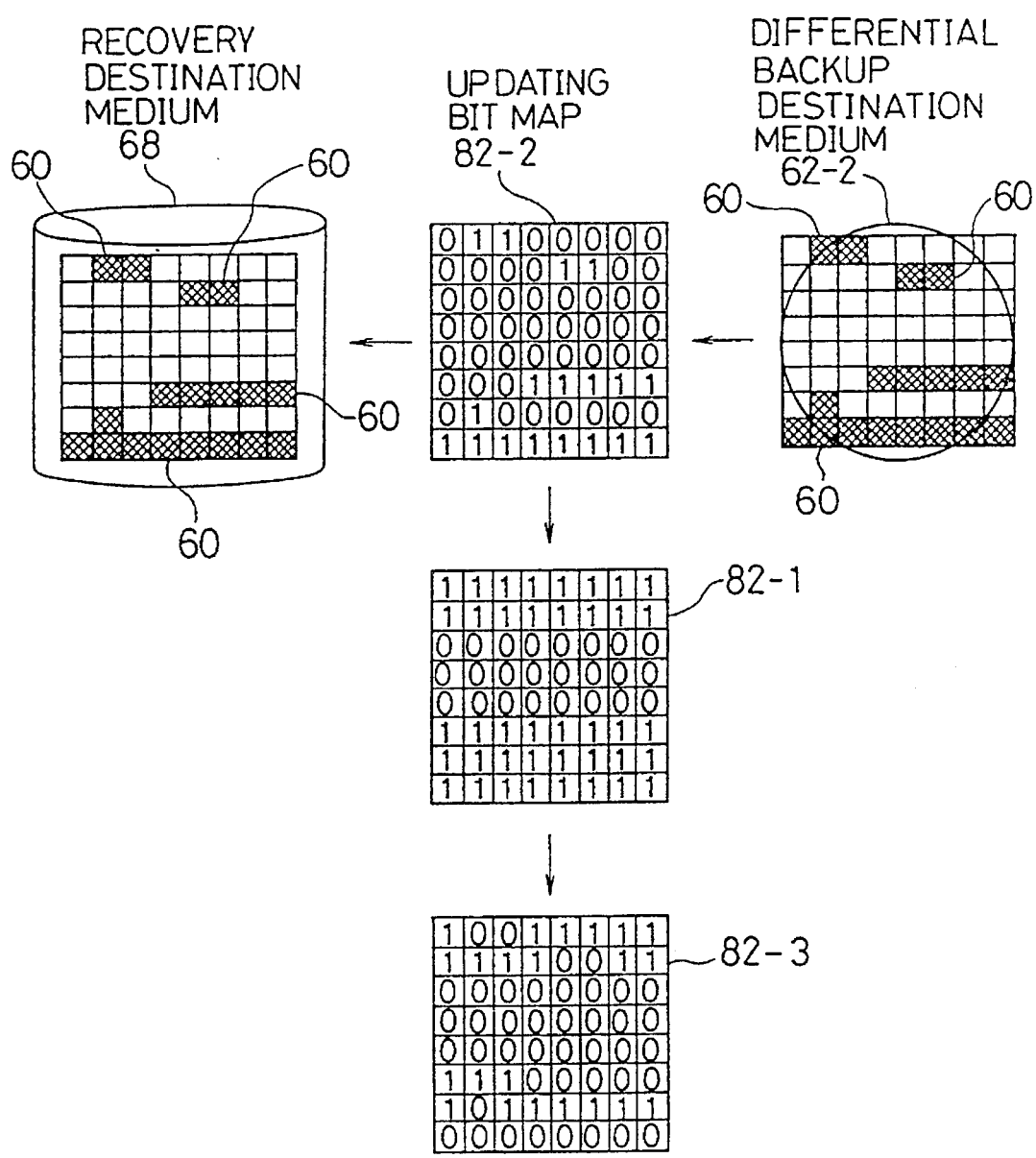
FIG. 34 is an explanatory diagram of the recovery process at the first stage which is executed by reading the newest differential backup destination medium.

FIG. 33 shows a situation of the newest differential backup which is used for the recovery sequential processes in combination with the whole backup in FIG. 32. In the differential backup, as shown in the backup target medium 52, an effective region 58-1 is the same as the whole backup in FIG. 32. As for an effective region 58-3, however, the position of the region 58-3 is changed to the position which is deviated to the lower side by one step. In such a case, only the updating data 60 of the effective bits 1 which were obtained from the AND of the bits existing at the same positions of an effective region bit map table 64-2 and an updating bit map table 82-2 is copied to the differential backup destination medium 62-2. With respect to the recovery sequential processes, the newest differential backup destination medium 62-2 shown in FIG. 33 is first read and the whole backup destination medium 62-1 shown in FIG. 32 is subsequently read, thereby executing the recovery process. Although the number of differential backup destination media has been set to one in order to simplify the explanation, in the case where there are a plurality of differential backup destination media, the differential backup destination media are sequentially read in accordance with the order from the new medium. FIG. 34 shows a recovery process at the first stage by the reading of the newest differential backup destination medium 62-2 shown in FIG. 33. In the recovery process at the first stage, the updating data 60 corresponding to the effective bits 1 of the updating bit map table 82-2 of the newest differential backup medium 62-2 is first read and is written to a recovery medium 68. The effective bits of the bit map table 82-1 of the previous backup destination medium shown in FIG. 32, namely, the whole backup destination medium 62-1 are turned off to the invalid bits 0 by the effective bits 1 in the updating bit map table 82-2 which has already been written to the recovery destination medium 68. Due to this, a new updating bit map table 82-3 is obtained.

Figure 35:
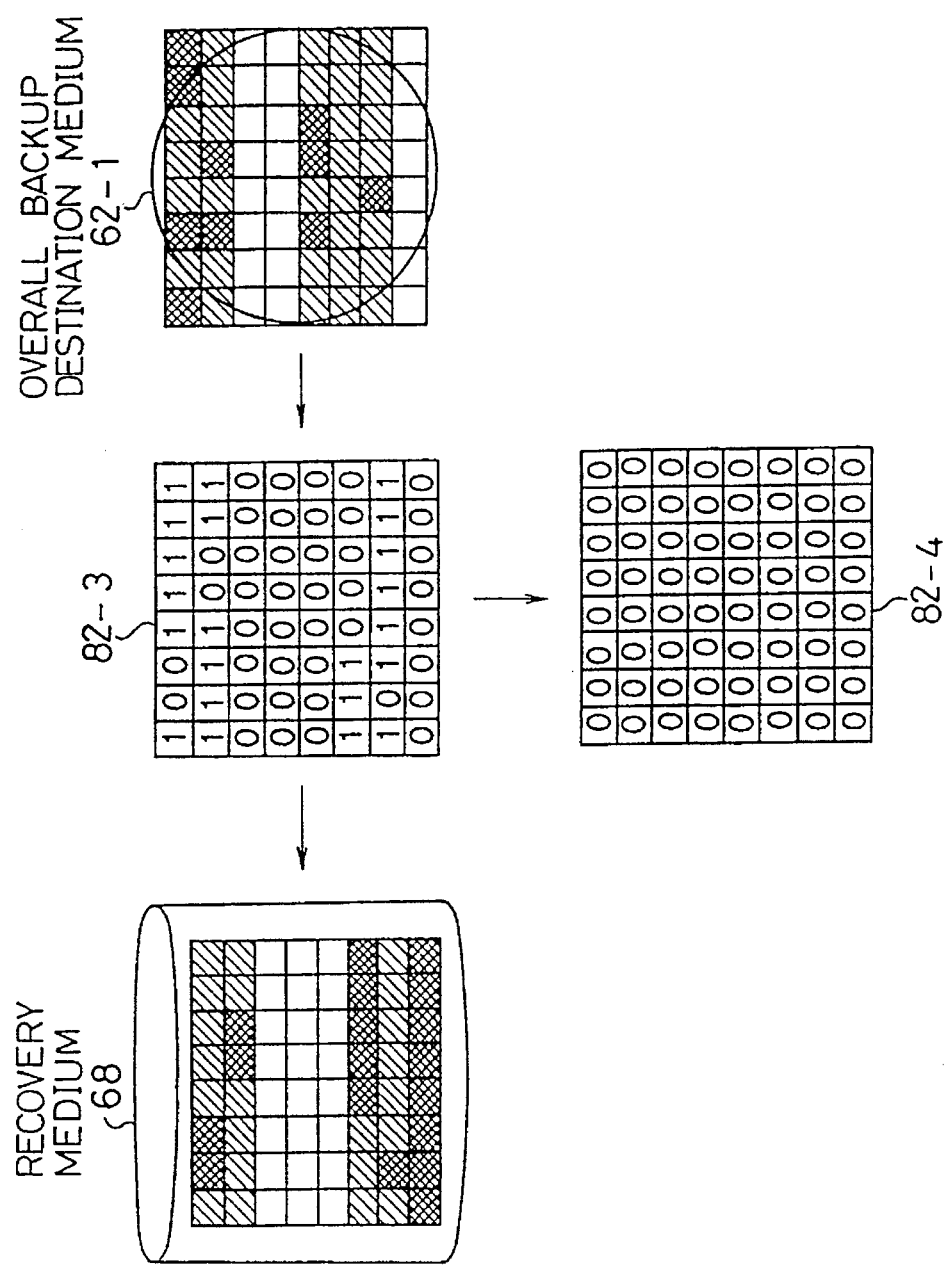
FIG. 35 is an explanatory diagram of the recovery process at the final stage which is executed by reading the oldest whole backup destination medium.

FIG. 35 shows a the recovery process at the second stage which is executed by reading the data from the whole backup destination medium 62-1. In this case, the recovery process at the final stage is shown. When reading the data from the whole backup destination medium 62-1, the updating bit map table 82-3 obtained at the second stage in FIG. 34 and the data at the positions corresponding to the effective bits 1 in the table 82-3 are read from the whole backup destination medium 62-1 and are written to the recovery medium 68. In the writing, the effective bits 1 which have already been written in the updating bit map table 82-3 are turned off to the invalid bits 0. An updating bit map table 82-4 shows a state in which the data corresponding to all of the effective bits 1 of the updating bit map table 82-3 has been written to the recovery destination medium 68. Since all of the bits of the updating bit map table 82-4 are set to the invalid bits 0 in this instance, it is recognized that the recovery sequential processes have been finished at that time point, thereby finishing the processes.

Figure 36:
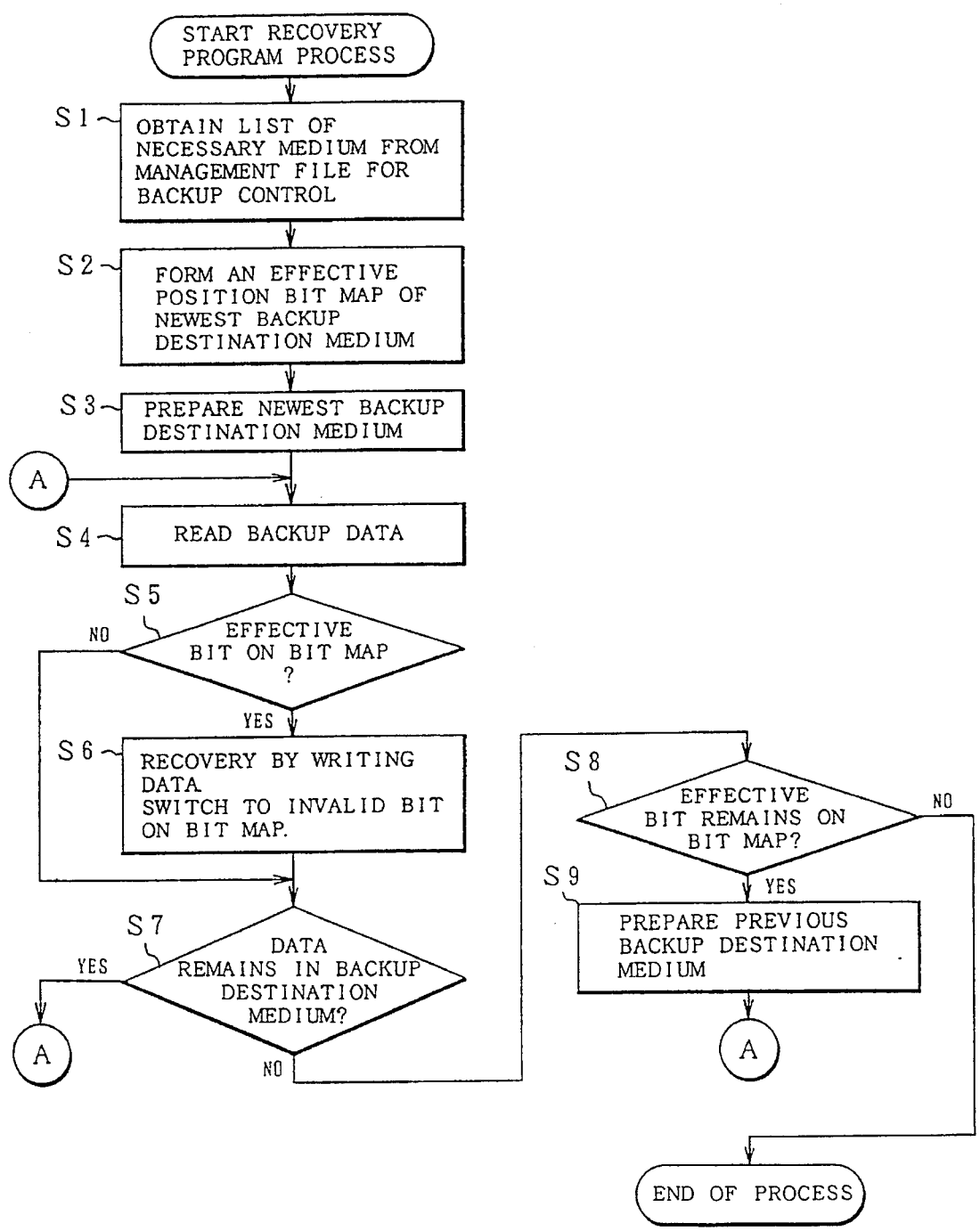
FIG. 36 is a flowchart showing the recovery process by the sequential reading of the invention.

A flowchart of FIG. 36 shows recovery sequential processes according to the invention. In step S1, a list of media which are necessary for recovery is obtained from the management file 50 for backup control. In step S2, a bit map indicative of an effective position as a storing position of the updating data with respect to the newest backup destination medium is formed. In this instance, in the case where the updating bit map has already been registered in the management file 50 for backup control, there is no need to form the bit map. The newest backup destination medium is prepared in step S3. The backup data is subsequently read from the backup destination medium in step S4. A check is made in step S5 to see if it is the effective bit 1 or not on the bit map table. If it is the effective bit 1, in step S6, the read backup data is written to the recovery destination medium and is recovered. The effective bits 1 are switched to the invalid bits 0 on the bit map. If it is not the effective bit 1 in step S5, or when the recovery writing and the switching to the invalid bits are finished in step S6, a check is made in step S7 to see if the reading data which is not processed remains in the backup destination medium or not. The processes in steps S4 to S6 are repeated until all data is read. When the reading of all media from the backup destination medium is finished in step S7, a check is made in step S8 to see if the effective bit remains in the bit map or not. If the effective bit remains, the processing routine advances to step S9, the previous backup destination medium is prepared, and the processes in steps S4 to S7 are repeated. In the case where no effective bit remains on the bit map in step S8 and all bits are the invalid bits, the end of recovery process is recognized and a series of processes are finished.

Recovery Parallel Processes

Figure 37:
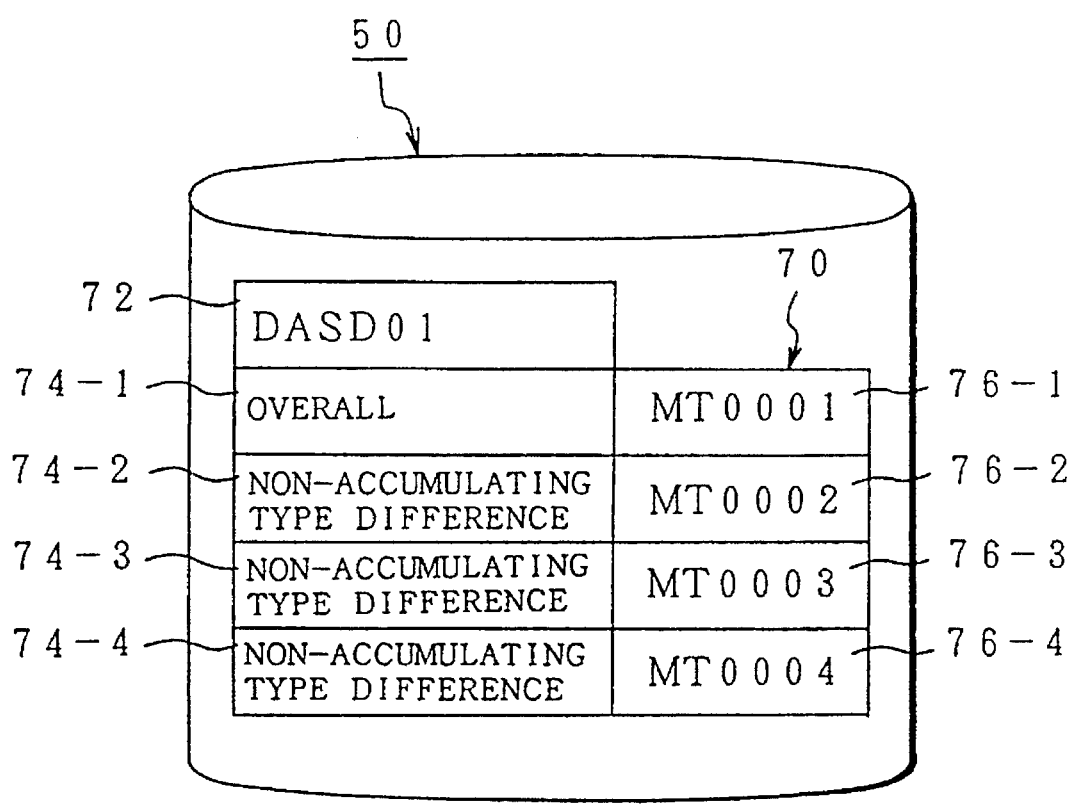
FIG. 37 is an explanatory diagram of the backup destination medium information which is used in the recovery process which is executed by the parallel reading.
Figure 38:
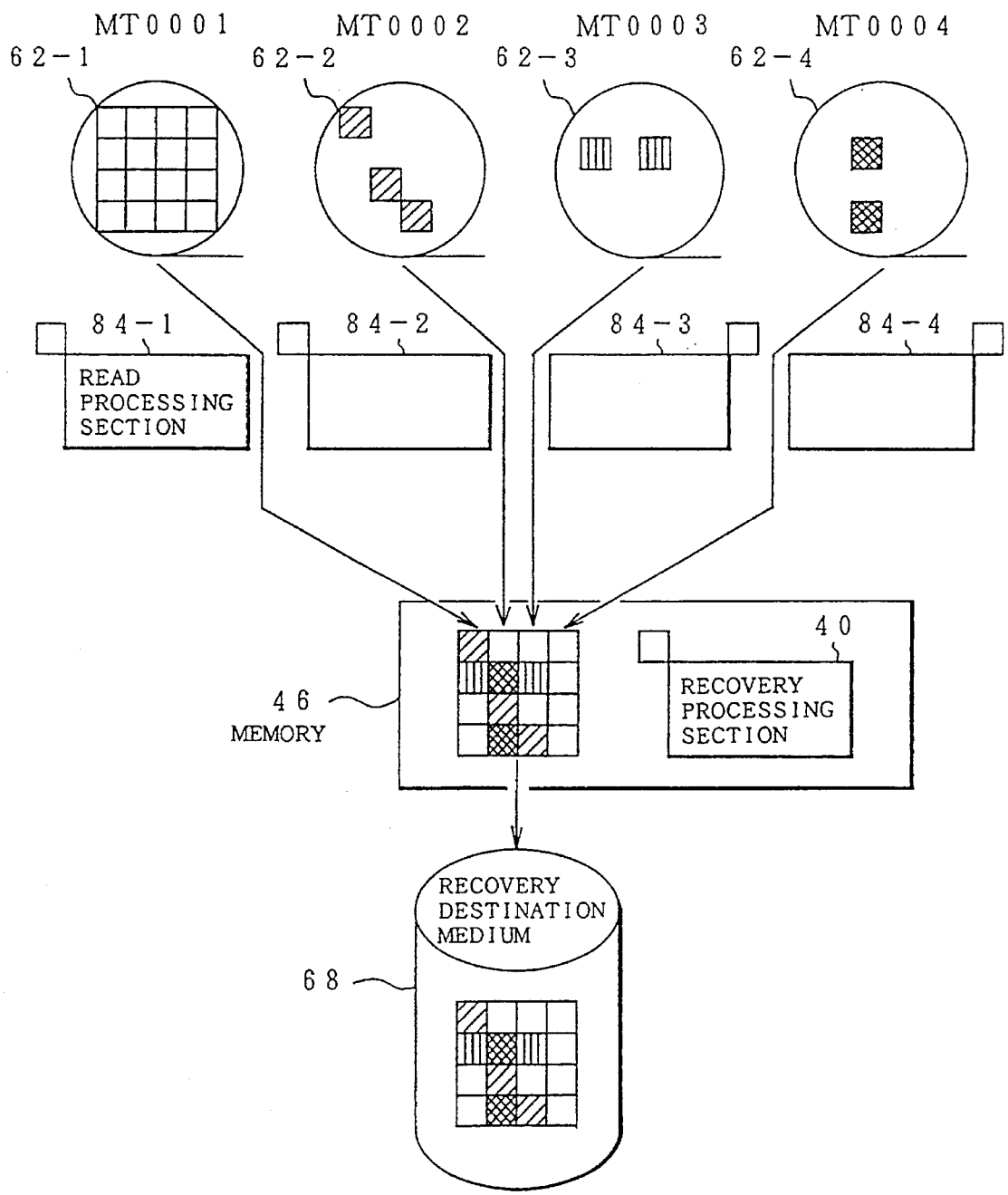
FIG. 38 is an explanatory diagram of the recovery process according to the parallel reading based on the medium information of FIG. 37.

The details of the recovery parallel processes using a plurality of I/O apparatuses shown in step S7 in FIG. 27 will now be described. FIG. 37 shows an example of the management information table of the backup destination medium which is used in the recovery parallel processes. The backup destination media 62-1 to 62-4 designated by the management information table 70 have the backup contents shown in FIG. 38. In the recovery processing section 40 developed in the memory 46, since I/O apparatuses are individually allocated to each of the recovery destination media 62-1 to 62-4, tasks as read processing sections 84-1 to 84-4 are allocated to each of the I/O apparatuses and the parallel reading of the data existing at the same positions in each medium is executed. With respect to four recovery data which were read into the memory 46 by the read processing sections 84-1 to 84-4, the recovery processing section 40 writes the newest data as effective data to the recovery destination medium 68. By sequentially repeating such parallel processes with respect to all of the data positions, even if a plurality of backup destination media 62-1 to 62-4 are used, the data can be written to the recovery destination medium 68 in the same processing time as that of the recovery process in which one recovery destination medium by the whole backup is used.

Figure 39:
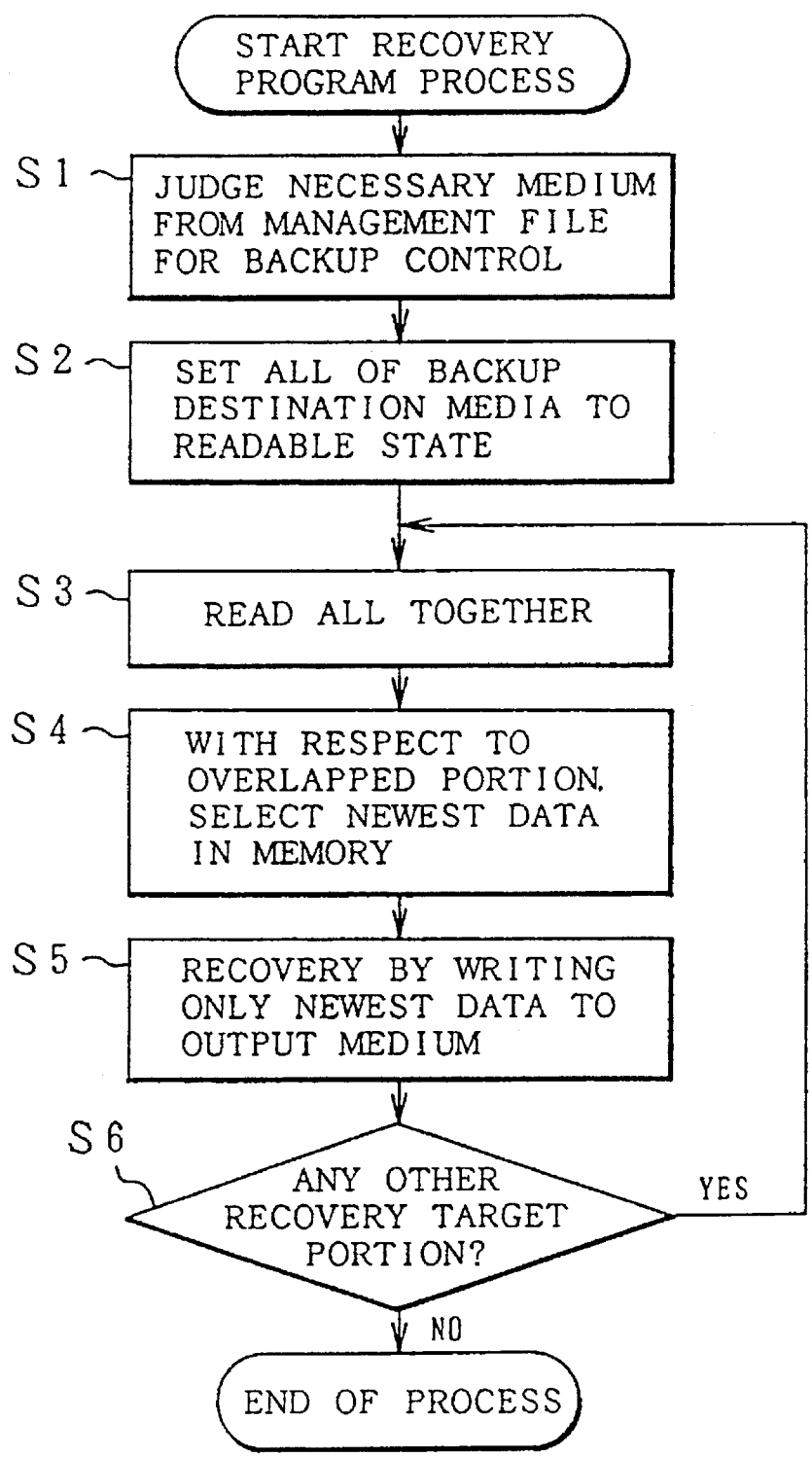
FIG. 39 is a flowchart showing the recovery process according to the parallel reading of the invention.

A flowchart of FIG. 39 shows recovery parallel processes of the invention. In step S1, the media which are necessary for the recovery are judged by the management file 50 for backup control. All of the backup destination media are set to the I/O apparatus, thereby setting those media into a readable state in step S2. In step S3, the data is read from the same positions of all of the backup destination media. With respect to the overlapped portions, the newest data is selected in the memory in step S4. Only the newest data is written to an output medium as a recovery destination, thereby recovering in step S5. The above processes in steps S3 to S5 are repeated until the recovery target portions are finished in step S6.

According to the invention as mentioned above, preparations such as outputting of the updating portion information, estimation of a media amount of backup and backup time, judgment of proper use of the whole backup and the differential backup, and the like which were executed by the backup operator every time of the backup are not needed. Therefore, the number of processes for the backup preparation is reduced and, as a result, the backup time can be reduced. A change from the whole backup to the differential backup is performed by once defining to the management file for backup control and the number of processes when changing a use format and the preparing period of time can be reduced, so that the use format can be easily changed.

Further, since an introducing work becomes difficult, the usage by the differential backup cannot be executed. According to the invention, however, the usage in combination with the differential backups can be executed without being conscious of the introducing work by automatically properly using the whole backup and the differential backup.

Even if the number of backup destination media is increased by the combination of the differential backup, since the number of backup destination media which are necessary to the recovery process is reduced to the necessary minimum number by the merge process using the vacant time having a low work load, so that the recovering time can be reduced and the backup destination medium can be easily managed. In particular, in the case where the recovering time is restricted and it is difficult to recover by the number of media by the differential backup, the recovery can be executed by using the backup destination media by the merge process in a sufficient with an enough surplus time and the work stop time which is necessary for the recovery can be minimized.

Even if a number of backup destination media can be obtained by combining the differential backups, the time of the reading process of the backup destination medium which occupies most of the recovery time can be reduced and the recovery can be efficiently executed by performing the reading process in which the unnecessary media are automatically eliminated at the time of recovery.

Even in the case where there is one I/O apparatus which can be used at the time of recovery and only sequential processes of the backup destination medium can be executed, the newest data is written as recovery data with respect to the overlapped backup data existing at the same positions, so that the recovery time can be minimized.

Further, in the case where the backup destination data using a plurality of I/O apparatuses can be read, by executing in parallel the parallel reading from the same position of a plurality of backup data and the writing process for writing the newest data of a plurality of read data as effective data into the recovery destination, even if there are a plurality of differential backup destination media, the processes can be also efficiently performed in the recovery time which is equal to that in case of using one whole backup destination medium.

Although the magnetic disk unit has been described as an example as a recovery target medium in the above embodiments, in addition to them, the invention also includes a proper direct access device such as optical disk unit using a semiconductor memory, system memory device, magnetooptic disk unit, floppy device, or the like. As a backup destination medium, the magnetic tape unit using a magnetic tape such as open reel or cartridge has been described as an example. However, a magnetic disk unit, a magnetoopic disk unit, a semiconductor disk unit, a system memory device, or a floppy device can be also used as a backup destination medium.

Further, although the bit map in which the one bit is allocated to one updating data has been used as information indicating the position of the updating data, it is also sufficient to express by the starting position and the size of the updating data, the starting position and the end position of the updating data, the starting position and the size of the location which is not the updating data, and the starting position and the end position of the location which is not the updating data other than the expressing format by the bit map. This point shall also apply to the case of the effective region using the bit map. Further, the present invention is not limited by the numerical values shown in the embodiments.

What is claimed is:

1. A backup control apparatus of a data processing system for performing an automatic backup process, comprising:

a backup target medium to store processing data;

a backup destination medium to store data copied from said backup target medium;

environment defining means for defining a backup operation environment;

control information managing means for registering and managing the backup operation environment defined by said environment defining means, the managed backup operation environment defining backup starting conditions;

backup instructing means for instructing the start of the automatic backup process; and backup processing means for selecting and executing one of a whole backup process for copying all the data stored in the backup target medium to said backup destination medium as backup data, and a differential backup process for extracting data which was updated in the backup target medium and copying said updated data to said backup destination medium as backup data, the backup processing means selecting and executing one of the whole backup process and the differential backup process each time the backup starting conditions are satisfied when said backup instructing means instructs the start of an automatic backup process.

2. An apparatus according to claim 1, wherein each time said backup processing means selects and executes the differential backup process, said backup processing means executes one of a non-accumulating type differential backup process for extracting differential data which was updated by using the just-previous whole backup data or the differential backup data of said backup target medium as a reference, and an accumulating type differential backup process for extracting differential data which was updated by using the previous whole backup data of the backup target medium as a reference.

3. An apparatus according to claim 1, wherein information indicative of the position of updated data stored in said backup target medium is provided in said backup target medium or in a control section of an input/output unit of the backup target medium, and an initialization and a writing of the information indicative of the position are executed.

4. An apparatus according to claim 1, wherein said backup processing means compares the number of present updating data of the backup target medium and a predetermined reference value, executes said whole backup process when said number is equal to or larger than said reference value, and executes said differential backup process when said number is smaller than the reference value.

5. An apparatus according to claim 1, wherein said control information managing means designates a backup target medium on a medium unit basis, and said backup processing means executes the selected one of the whole backup process and the differential backup process on a designation medium unit basis.

6. An apparatus according to claim 1, wherein:

the backup target medium includes a plurality of individual backup target media, said control information managing means divides the individual backup target media into backup target groups, each backup target group having at least one individual backup target media, and designates backup target groups and said backup processing means executes the selected one of the whole backup process and the differential backup process for the designated backup target groups.

7. An apparatus according to claim 6, wherein said control information managing means divides the individual backup target media into backup target groups hierarchically in accordance with the frequency of use of the individual backup target media.

8. An apparatus according to claim 6, wherein said control information managing means divides the individual backup target media into backup target groups hierarchically in accordance with a significance.

9. An apparatus according to claim 6, wherein said control information managing means divides the individual backup target media into backup target groups by dividing one backup target group into a plurality of lower groups, to divide the one backup target group into hierarchy groups having a tree structure in a range from upper groups to lower groups, and a backup operation environment is set every group hierarchy.

10. An apparatus according to claim 1, wherein:

said backup operation environment includes backup destination medium information, and table information in which an ID number of the backup target medium, an identifier indicative of a format of the automatic backup process, and an ID number of the backup destination medium are registered in said control information managing means as said backup destination medium information.

11. An apparatus according to claim 10, wherein one of an identifier indicative of a whole backup, a non-accumulating type differential backup, and an accumulating type differential backup is used as said identifier indicative of the format of the automatic backup process.

12. An apparatus according to claim 1, wherein said backup processing means executes the selected one of the whole backup process and the differential backup process by referring to updating position information indicative of the position of updated data provided in the backup target medium.

13. An apparatus according to claim 11, wherein said backup processing means copies the updating position information to the backup destination medium together with the copied updated data.

14. An apparatus according to claim 13, wherein said backup processing means registers the updating position information obtained from the backup target medium to said control information managing means and allows said updating position information to be managed.

15. An apparatus according to claim 1, wherein said backup processing means refers to updating position information indicative of the position of the updating data derived from the backup target medium and information of an effective region of the backup target medium which is accessed, and extracts data at the position where the AND of said updating position information and said information of an effective region is derived as backup data.

16. An apparatus according to claim 15, wherein said backup processing means copies the updating position information and the information of the effective region to the backup destination medium together with the backup data.

17. An apparatus according to claim 16, wherein said updating position information and said effective region information are bit map information in which updating data of a predetermined length is made to correspond to one bit.

18. An apparatus according to claim 17, wherein, when using a disk medium as the backup target medium, said backup processing means forms the bit map information in which one track of the disk medium is made to correspond to one bit.

19. An apparatus according to claim 1, wherein the backup destination medium includes a plurality of individual backup destination media, the plurality of individual backup destination media including one whole backup destination medium and a plurality of differential backup destination media, the apparatus further comprising:

merge processing means for merging the backup data of the one whole backup destination medium and the plurality of differential backup destination media and for storing the merged backup data into a smaller number of individual backup destination media.

20. An apparatus according to claim 19, wherein:

said environment defining means defines executing conditions of a merging process to merge the backup destination medium after completion of the automatic backup process;

said control information managing means registers and manages the executing conditions of said merging process defined by said environment defining means; and said merge processing means automatically executes the merging process on the basis of managed executing conditions.

21. An apparatus according to claim 20, wherein the backup destination medium includes an input/output unit, and said merge processing means executes merging when a work load of the data processing system decreases and there is a vacancy in the input/output unit of said backup destination medium.

22. An apparatus according to claim 19, wherein said merge processing means executes merging in accordance with a result of discrimination regarding whether a format of a differential backup destination medium as a merge target derived from said control information managing means is one of a non-accumulation type merge process, an accumulating type merge process, and a mixture type merge process.

23. An apparatus according to claim 22, wherein, when a plurality of differential backup destination media as merge targets are the non-accumulating type, said merge processing means merges so that the newest data among the whole backup destination medium and all of the differential backup destination media is left as effective data, thereby producing one whole backup destination medium.

24. An apparatus according to claim 22, wherein, when a plurality of differential backup destination media as merge targets are the non-accumulating type, said merge processing means merges so that the newest data among all of the differential backup destination media is left as effective data, thereby producing one accumulating type differential backup medium.

25. An apparatus according to claim 22, wherein, when the differential backup destination medium as a merge target is the accumulating type, said merge processing means merges so that the newest data in the whole backup destination medium and the newest accumulating type differential backup destination medium is left as effective data, thereby producing one whole backup destination medium.

26. An apparatus according to claim 19, wherein said control information managing means designates the merge process by said merge processing means according to a backup target medium unit basis.

27. An apparatus according to claim 19, wherein: said backup target medium includes a plurality of individual backup target media, and said control information managing means divides the individual backup target media into backup target groups, each backup target group having at least one individual backup target media, and designates the merge process by said merge processing means.

28. An apparatus according to claim 27, wherein said control information managing means divides the individual backup target medium into backup target groups by dividing one backup target group into a plurality of lower groups, to divide the one backup target group into hierarchy groups having a tree structure in a range from upper groups to lower groups, and merge executing conditions are set every group hierarchy.

29. An apparatus according to claim 1, further comprising:

recovery operation environment defining means for defining a recovery operation environment on the basis of predetermined definition information;

recovery instructing means for instructing the start of a recovery process; and recovery processing means for determining whether an identifier of the backup destination medium used for the recovery process indicates the a differential backup process with reference to said control information managing means, for copying the data of the whole backup destination medium to the recovery destination medium when no differential backup destination medium is included, and for producing recovery data from the whole backup destination medium and the differential backup destination medium and copying to the recovery destination medium when the differential backup destination medium is included.

30. An apparatus according to claim 29, wherein, when executing the recovery process by using a plurality of differential backup destination media, said recovery processing means discriminates the differential backup destination media which are not used for the recovery process on the basis of the updating position information of the differential backup destination media registered in the control information managing means at the time of the backup process and eliminates said discriminated differential backup destination media.

31. An apparatus according to claim 30, wherein said recovery processing means changes the effective bits in an updating bit map existing at the same positions as those of the effective bits in an updating bit map indicative of the newest updating position in a plurality of differential backup destination media to the invalid bits and eliminates the differential backup destination medium of the updating bit map in which all of the bits were changed to the invalid bits from the processing targets.

32. An apparatus according to claim 29, wherein, when executing the recovery process by using a plurality of differential backup destination media, when the number of input/output units for backup which are used for reading the backup destination medium is equal to one, said recovery processing means sequentially reads the data from the newest differential backup destination medium and leaves the newest updating data as backup data.

33. An apparatus according to claim 32, wherein: said recovery processing means sequentially repeats processes such that an effective region bit map indicative of effective regions is developed from a plurality of backup destination media which are used for recovery, an updating bit map indicative of the updating position is developed, the updating data corresponding to the effective bit position of the newest updating bit map is written to the recovery destination medium, and the effective bits which have already been written into the newest effective region bit map are switched to invalid bits in such a direction from the new backup destination medium to the old backup destination medium until all of the bits in the effective region bit map are switched to the invalid bits.

34. An apparatus according to claim 29, wherein, when a plurality of input/output units are used for reading the backup destination media, said recovery processing means simultaneously reads the backup data from a plurality of backup destination media, and when a plurality of updating data overlap at the same position, said recovery processing means writes the newest updating data as effective data to the recovery destination medium.

35. An apparatus according to claim 34, wherein said recovery means:

designates the read-out position information of the backup destination medium to each of said plurality of input/output units, designates the write position information of the recovery data to the input/output unit of the recovery destination medium, and allocates a use right of a central processing unit to each of the reading process and the writing process of said plurality of input/output units, thereby allowing said processes to be executed in parallel.

36. A backup control method of a data processing system for performing an automatic backup process, comprising:

an environment defining step of defining a backup operation environment;

a control information managing step of registering and managing a backup operation environment defined in said environment defining step, the managed backup operation environment defining backup starting conditions;

a backup instructing step of instructing the start of the automatic backup process; and a backup processing step of selecting and executing one of a whole backup process for copying all the data stored in the backup target medium to said backup destination medium as backup data, and a differential backup process for extracting data which was updated in the backup target medium and copying said updated data to the backup destination medium as backup data, the backup processing means selecting and executing one of the whole backup process and the differential backup process each time the backup starting conditions are satisfied when said backup instruction step instructs the start of an automatic backup process.

37. A method according to claim 36, wherein every time said backup processing step executes the differential backup process, said backup processing step further comprises executing one of a non-accumulating type differential backup process for extracting the differential data which was updated by setting the just-previous whole backup data or the differential backup data of the backup target medium to a reference, and an accumulating type differential backup process for extracting the differential data which was updated by setting the previous whole backup data of the backup target medium to a reference.

38. A method according to claim 36, further comprising the steps of:

providing information indicative of the position of updated data stored in the backup target medium for the backup target medium or in a control section of an input/output unit of the backup target medium, and executing an initialization and a writing of the information indicative of the position.

39. A method according to claim 36, wherein in said backup processing step further comprises:

comparing the number of present updating data of the backup target medium with a predetermined reference value, executing the whole backup process when the number of present updating data is equal to or larger than said reference value, and executing the differential backup process when the number of present updating data is smaller than the reference value.

40. A method according to claim 36, wherein:

said control information managing step further comprises designating the backup target medium on a medium unit basis, and said backup processing step further comprises executing and selecting one of the whole backup process and the differential backup process on a designation medium unit basis.

41. A method according to claim 36, wherein:

said control information managing step further comprises dividing individual backup target media into groups, each backup target group having at least one individual backup target media, and designating backup target groups, and said backup processing step further comprises executing the selected one of the whole backup process and the differential backup process for the designated backup target groups.

42. A method according to claim 41, wherein said control information managing step further comprises:

dividing the individual target media into backup target groups hierarchically in accordance with the frequency of use of the individual backup target media.

43. A method according to claim 41, wherein said control information managing step further comprises:

dividing the individual target media into target groups hierarchically in accordance with a significance.

44. A method according to claim 41, wherein said control information managing step further comprises:

dividing the individual backup target media into backup target groups by dividing one backup target group into a plurality of lower groups, to divide the one backup target group into hierarchy groups having a tree structure in a range from upper groups to lower groups, and setting a backup operation environment every group hierarchy.

45. A method according to claim 36, wherein the backup operation environment includes backup destination medium information, and said control information managing step further comprises:

registering table information in which an ID number of the backup target medium, an identifier indicative of a format of the automatic backup process, and an ID number of the backup destination medium as said backup destination medium information.

46. A method according to claim 45, further comprising the step of:

using one of an identifier indicative of the whole backup, the non-accumulating type differential backup, and the accumulating type differential backup as said identifier indicative of the format of the automatic backup process.

47. A method according to claim 36, wherein in said backup processing step further comprises:

executing the selected one of the whole backup process and the differential backup process by referring to updating position information indicative of the position of updated data provided in the backup target medium.

48. A method according to claim 47, wherein in said backup processing step further comprises:

copying the updating position information to the backup destination medium together with the copied updated data.

49. A method according to claim 48, wherein:

said backup processing step further comprises registering the updating position information obtained from the backup target medium, and said control information managing step further comprises managing the registered updated position information.

50. A method according to claim 36, wherein in said backup processing step further comprises:

referring to updating position information indicative of the position of the updating data obtained from the backup target medium and information of an effective region of the backup target medium which is accessed, and extracting data at the position where the AND of said updating position information and said information of an effective region is derived as backup data.

51. A method according to claim 50, wherein said backup processing step further comprises:

copying the updating position information and the information of the effective region to the backup destination medium together with the backup data.

52. A method according to claim 51, wherein said updating position information and said effective region information are bit map information in which updating data of a predetermined length is made to correspond to one bit.

53. A method according to claim 52, wherein, when using a disk medium as said backup target medium, said backup processing step further comprises:

forming the bit map information in which one track of the disk medium is made to correspond to one bit.

54. A method according to claim 36, wherein the backup destination medium includes a plurality of individual backup destination media, the plurality of individual backup destination media including one whole backup destination medium and a plurality of differential backup destination media, the method further comprising:

a merge processing step of merging the backup data of the one whole backup destination medium and the plurality of differential backup destination media, thereby storing the merged backup data to a smaller number of individual backup destination media.

55. A method according to claim 54, wherein in said merge processing step further comprises the step of:

automatically executing the merging process on the basis of executing conditions which have previously been registered in said control information managing step.

56. A method according to claim 55, wherein in said merge processing step further comprises:

executing said merge process when a work load of the data processing system decreases and there is a vacancy in an input/output unit of the backup destination medium.

57. A method according to claim 54, wherein said merge processing step further comprises:

executing merging in accordance with a result of discrimination regarding whether a format of a differential backup destination medium as a merge target obtained in said control information managing step is one of a non-accumulating type merge process, the accumulating type merge process, and a mixture type merge process.

58. A method according to claim 57, wherein said merge processing step further comprises:

when a plurality of differential backup destination media as merge targets are the non-accumulating type, executing a merge so that the newest data among the whole backup destination medium and all of the differential backup destination media is left as effective data, thereby producing one whole backup destination medium.

59. A method according to claim 57, wherein said merge processing step further comprises:

when a plurality of differential backup destination media as merge targets are the non-accumulating type, executing a merge so that the newest data among all of the differential backup destination media is left as effective data, thereby producing one accumulating type differential backup medium.

60. A method according to claim 57, wherein said merge processing step further comprises:

when the differential backup destination medium as a merge target is the accumulating type, executing a merge so that the newest data in the whole backup destination medium and the newest accumulating type differential backup destination medium is left as effective data, thereby producing one whole backup destination medium.

61. A method according to claim 54, wherein said control information managing step further comprises:

designating the merge process executed in said merge processing step on a backup target medium unit basis.

62. A method according to claim 54, wherein the backup target medium includes a plurality of individual backup target media and said control information managing step further comprises:

dividing the individual backup target media are divided into backup target groups, each backup target group having at least one individual backup target media, and designating the merge process executed in said merge processing step.

63. A method according to claim 54, wherein said control information managing step further comprises:

dividing one backup target group into a plurality of lower groups, to divide the one backup target group into hierarchy groups having a tree structure in a range from upper groups to lower groups, and setting merge executing conditions every group hierarchy.

64. A method according to claim 36, further comprising:

an environment defining step of defining a recovery operation environment on the basis of predetermined definition information;

a recovery instructing step of instructing the start of a recovery process; and a recovery processing step of discriminating whether an identifier of the backup destination medium used for the recovery process indicates a differential backup process with reference to the information derived in said control information managing step, copying the data of the whole backup destination medium to a recovery destination medium when no differential backup destination medium is included, and producing recovery data from the whole backup destination medium and the differential backup destination medium and copying said recovery data to the recovery destination medium when the differential backup destination medium is included.

65. A method according to claim 64, wherein said recovery processing step further comprises, when executing the recovery process by using a plurality of differential backup destination media:

discriminating the differential backup destination media which are not used for the recovery process on the basis of the updating position information of the differential backup destination media registered in said control information managing step at the time of said backup process, and eliminating said discriminated differential backup destination media from the processing targets.

66. A method according to claim 65, wherein said recovery processing step further comprises:

changing the effective bits in another updating bit map at the same positions as the effective bits in an updating bit map indicative of the newest updating position in a plurality of differential backup destination media, to invalid bits, and eliminating the differential backup destination media in the updating bit map in which all bits are changed to the invalid bits, from the processing targets.

67. A method according to claim 64, wherein said recovery processing step further comprises, when executing the recovery process by using a plurality of differential backup destination media and the number of input/output units for backup which are used for reading the backup destination media is equal to one:

sequentially reading the data in accordance with the order from the newest differential backup destination medium, and leaving the newest updating data as backup data.

68. A method according to claim 67, wherein said recovery processing step further comprises:

developing processes of an effective region bit map indicative of the effective region from a plurality of backup destination media which are used for recovery, developing the updating bit map indicative of the updating position, writing the updating data corresponding to the effective bit positions in the newest updating bit map to the recovery destination medium, and switching the effective bits which have already been written in the newest effective region bit map, to the invalid bits, wherein the steps of developing processes, developing the updating bit map, writing the updating data and switching the effective bits are successively repeated in a direction from the new backup destination medium to the old backup destination medium until all bits in the effective region bit map are switched to the invalid bits.

69. A method according to claim 64, wherein said recovery processing step further comprises:

when a plurality of input/output units are used for reading to the backup destination media, simultaneously reading the backup data from a plurality of backup destination media, and when a plurality of updating data overlap at the same position, writing the newest updating data as effective data to the recovery destination medium.

70. A method according to claim 69, wherein said recovery step further comprises:

designating read-out position information of the backup destination medium to each of said plurality of input/output units, designating write position information of the recovery data to the input/output unit of the recovery destination medium, and allocating a use right of a central processing unit to each of the reading process and the writing process of said plurality of input/output units, thereby allowing said reading and writing processes to be executed in parallel.

* * * * *